Dec. 21, 1926.

E. F. BEUGLER 1,611,577

MACHINE FOR MAKING BARRELS

Filed Jan. 9, 1924 11 Sheets-Sheet 1

Dec. 21, 1926.  
E. F. BEUGLER  
1,611,577  
MACHINE FOR MAKING BARRELS  
Filed Jan. 9, 1924     11 Sheets-Sheet 2

Inventor  
Edwin F. Beugler  
by Potter Powers  
Attorneys

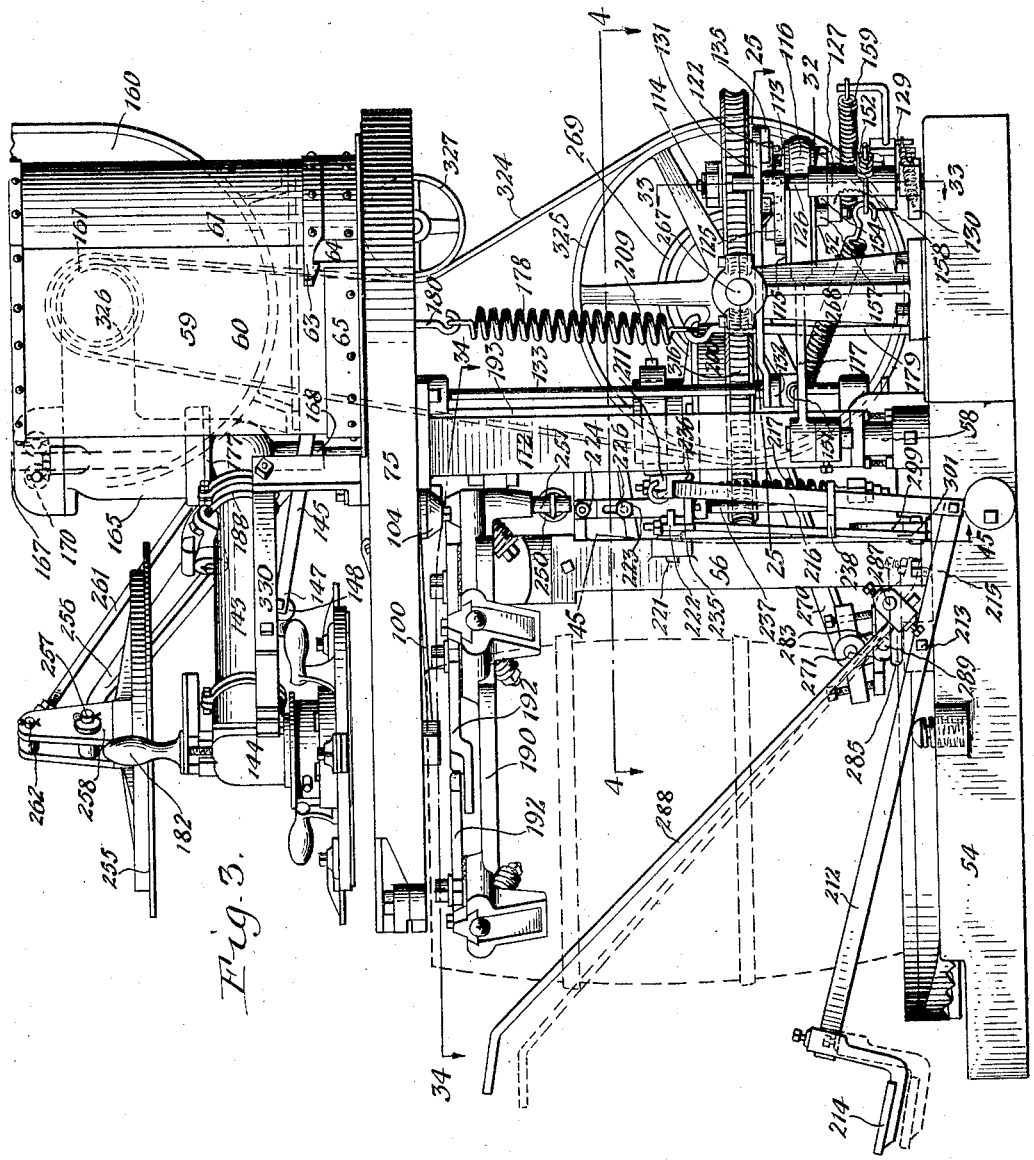

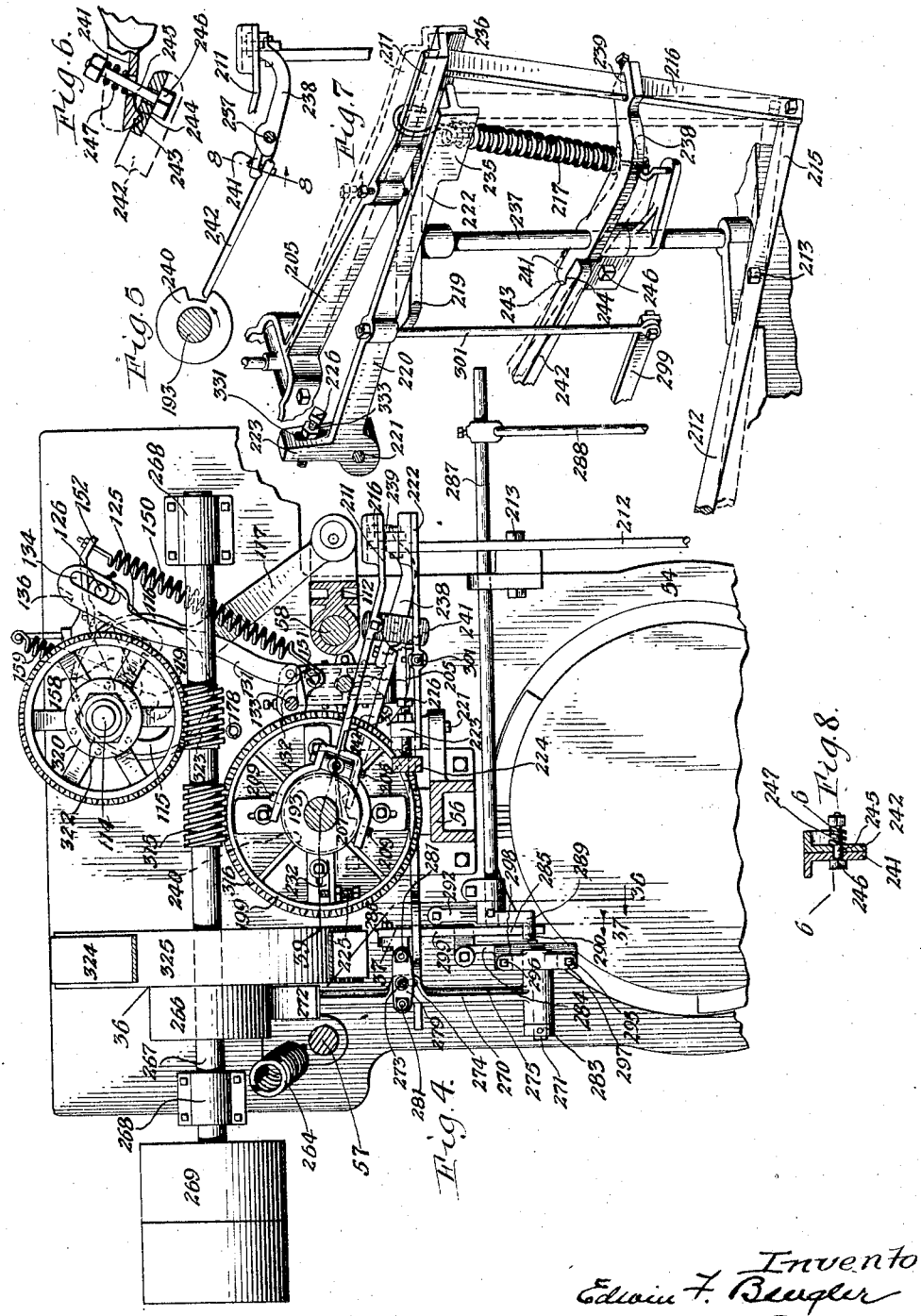

Dec. 21, 1926.          1,611,577
E. F. BEUGLER
MACHINE FOR MAKING BARRELS
Filed Jan. 9, 1924     11 Sheets-Sheet 5
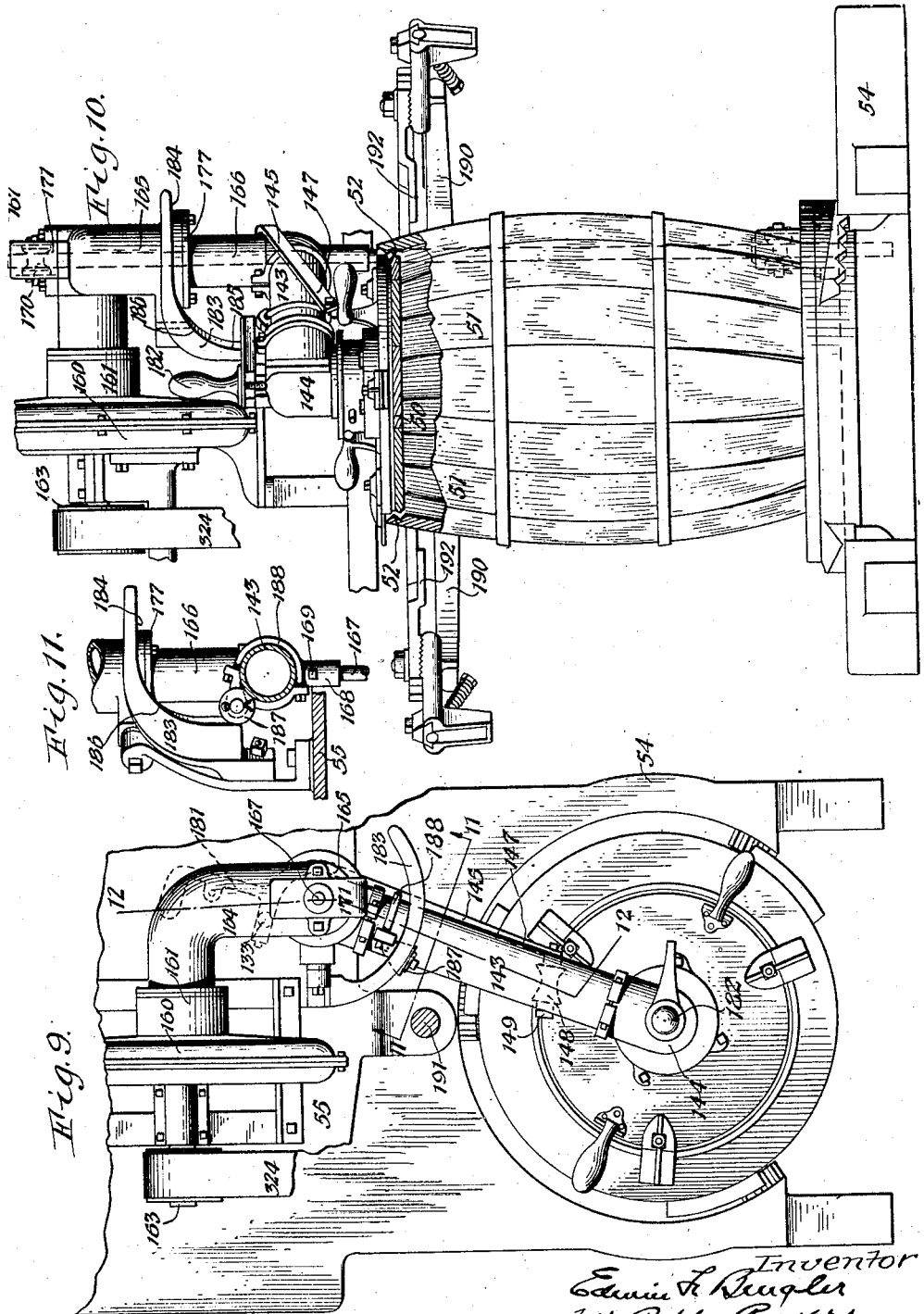

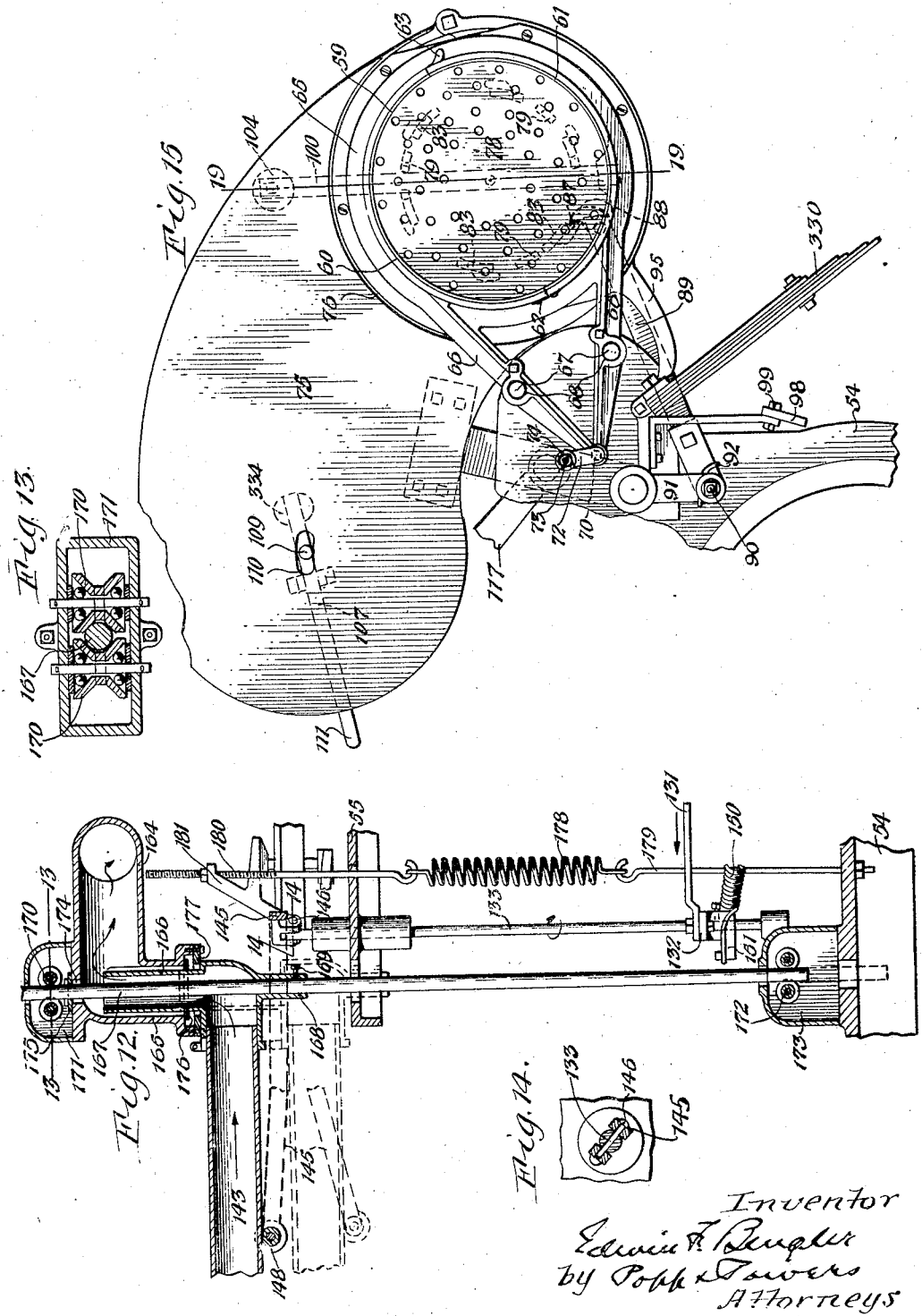

Dec. 21, 1926.
E. F. BEUGLER
1,611,577
MACHINE FOR MAKING BARRELS
Filed Jan. 9, 1924     11 Sheets-Sheet 7
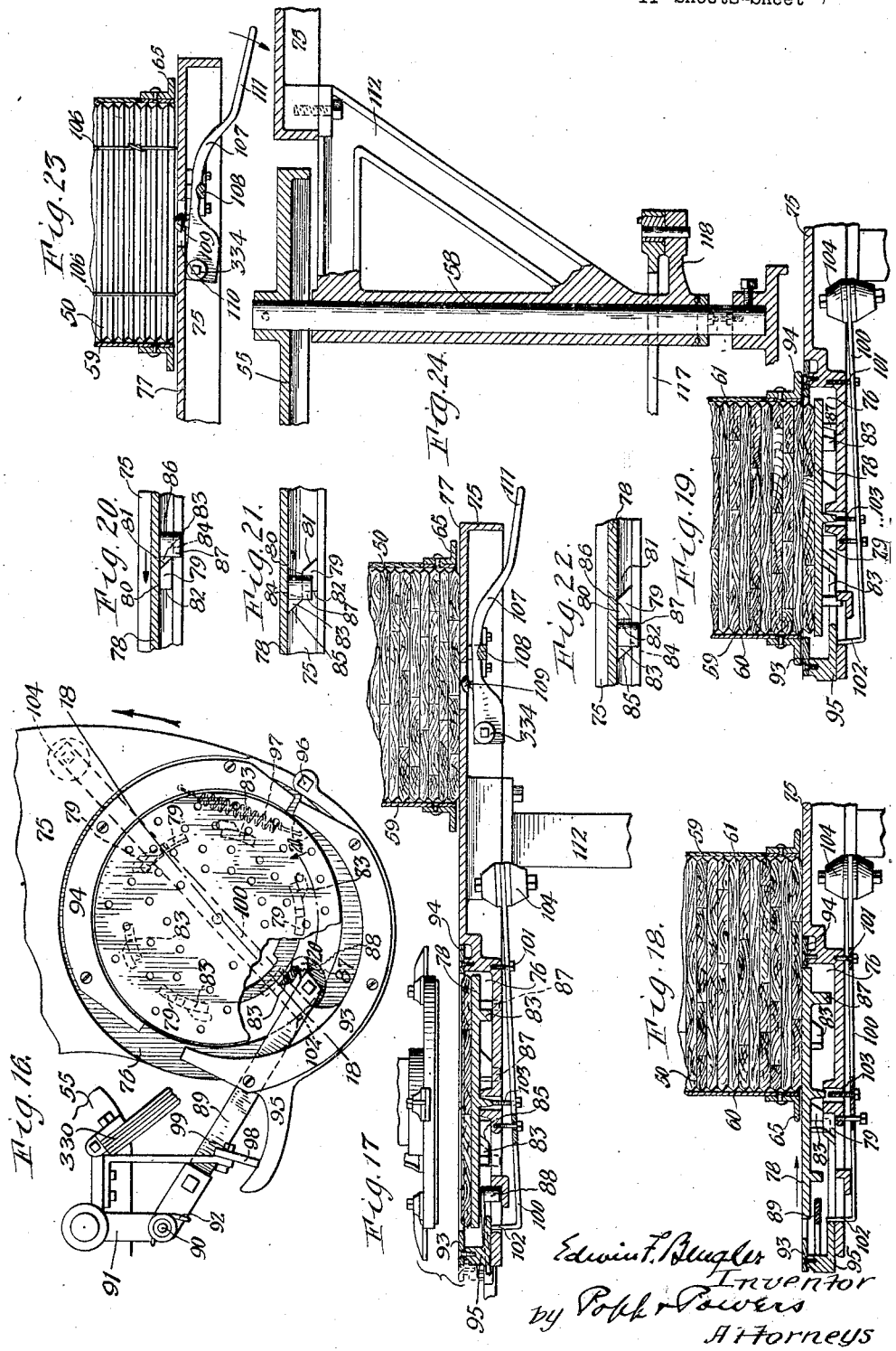

Dec. 21, 1926.
E. F. BEUGLER
1,611,577
MACHINE FOR MAKING BARRELS
Filed Jan. 9, 1924 11 Sheets-Sheet 8
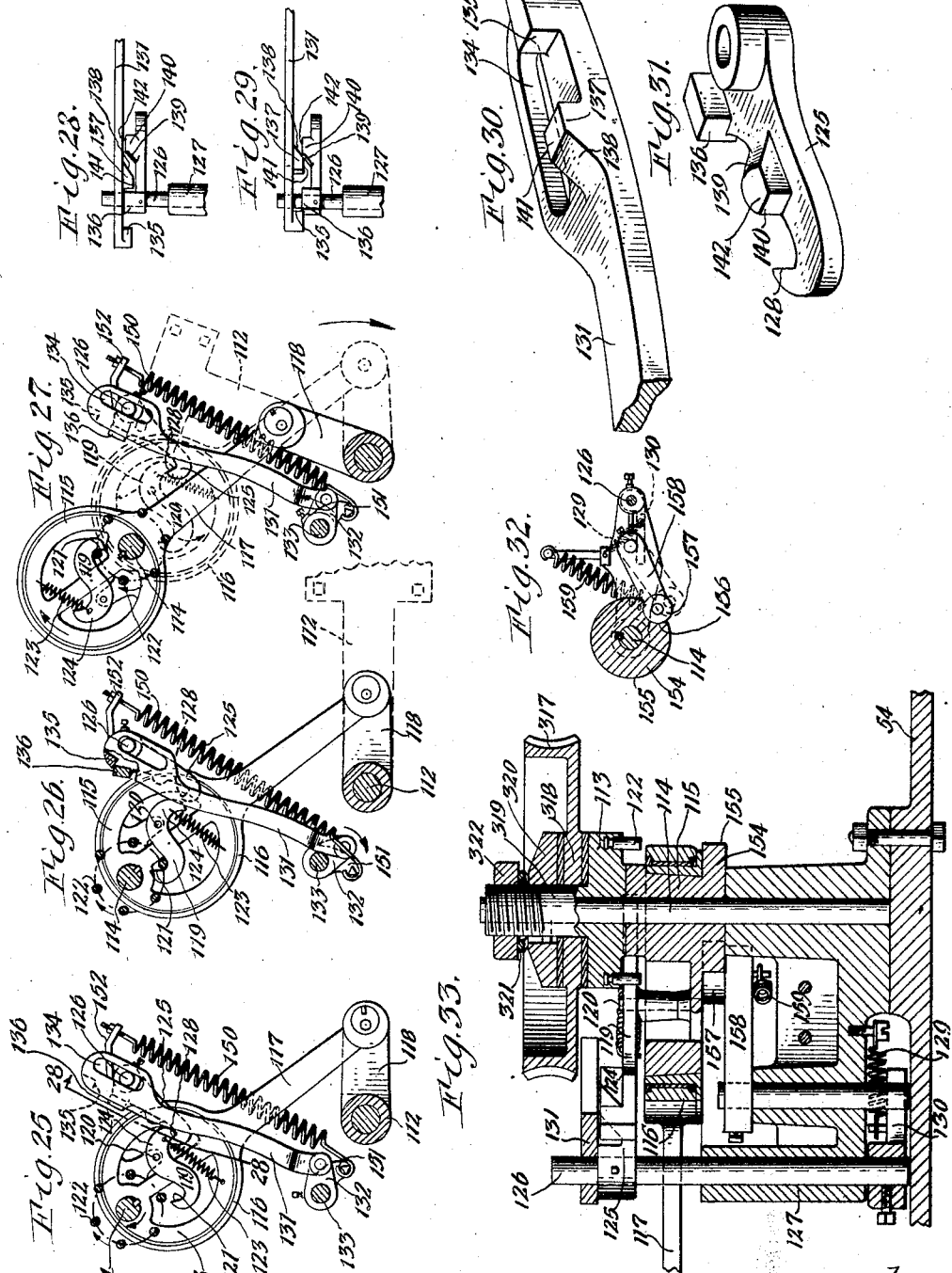

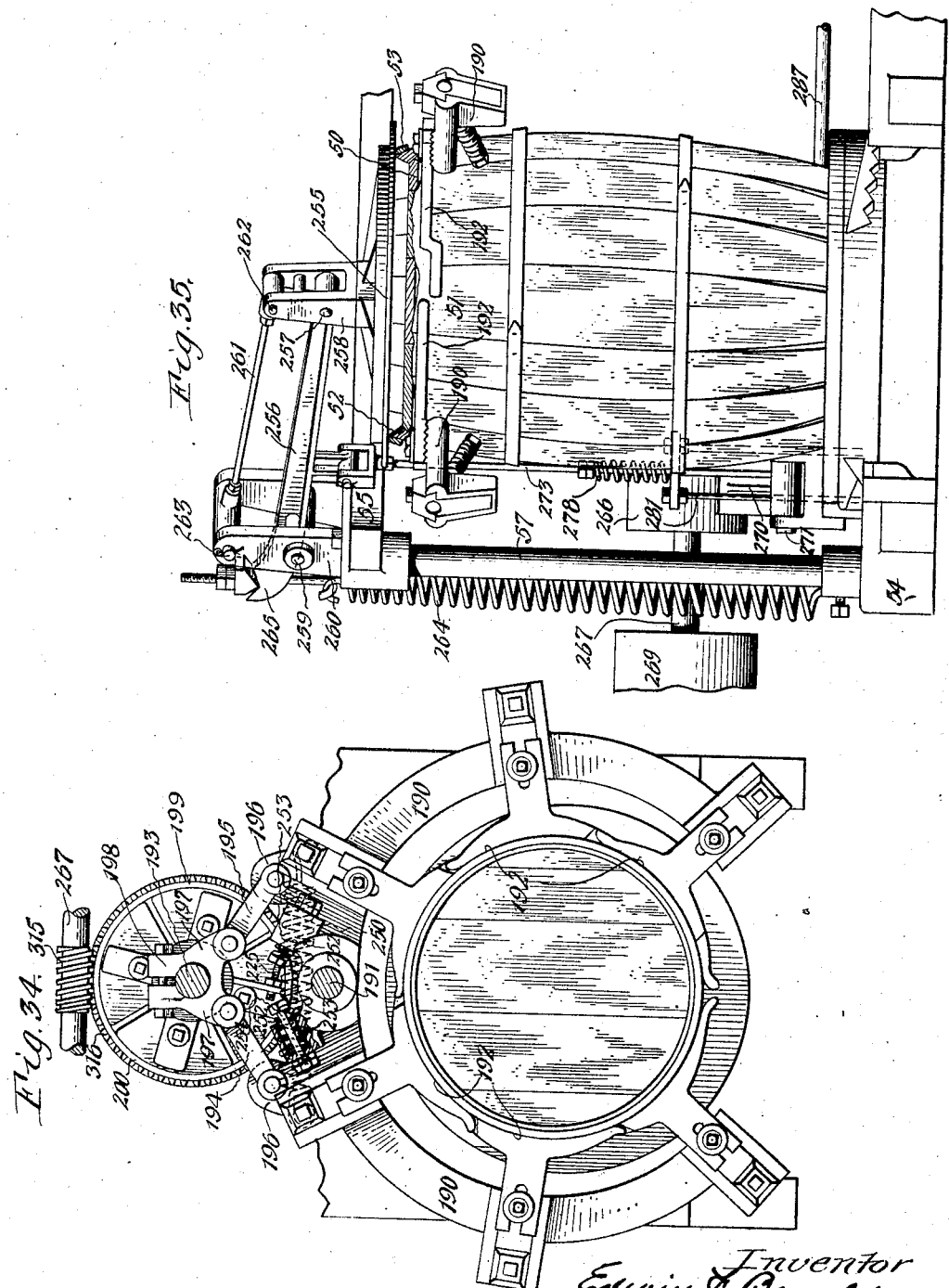

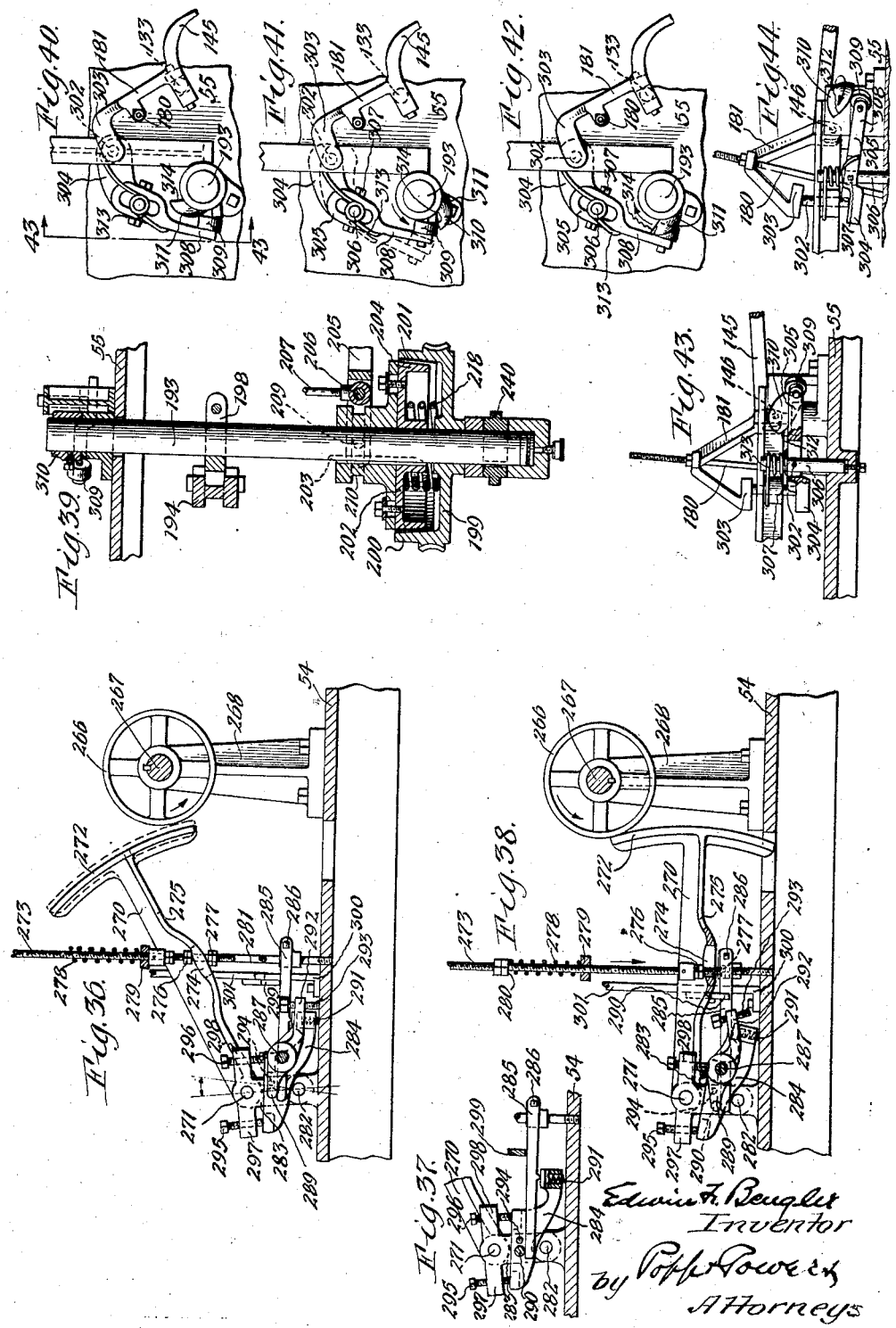

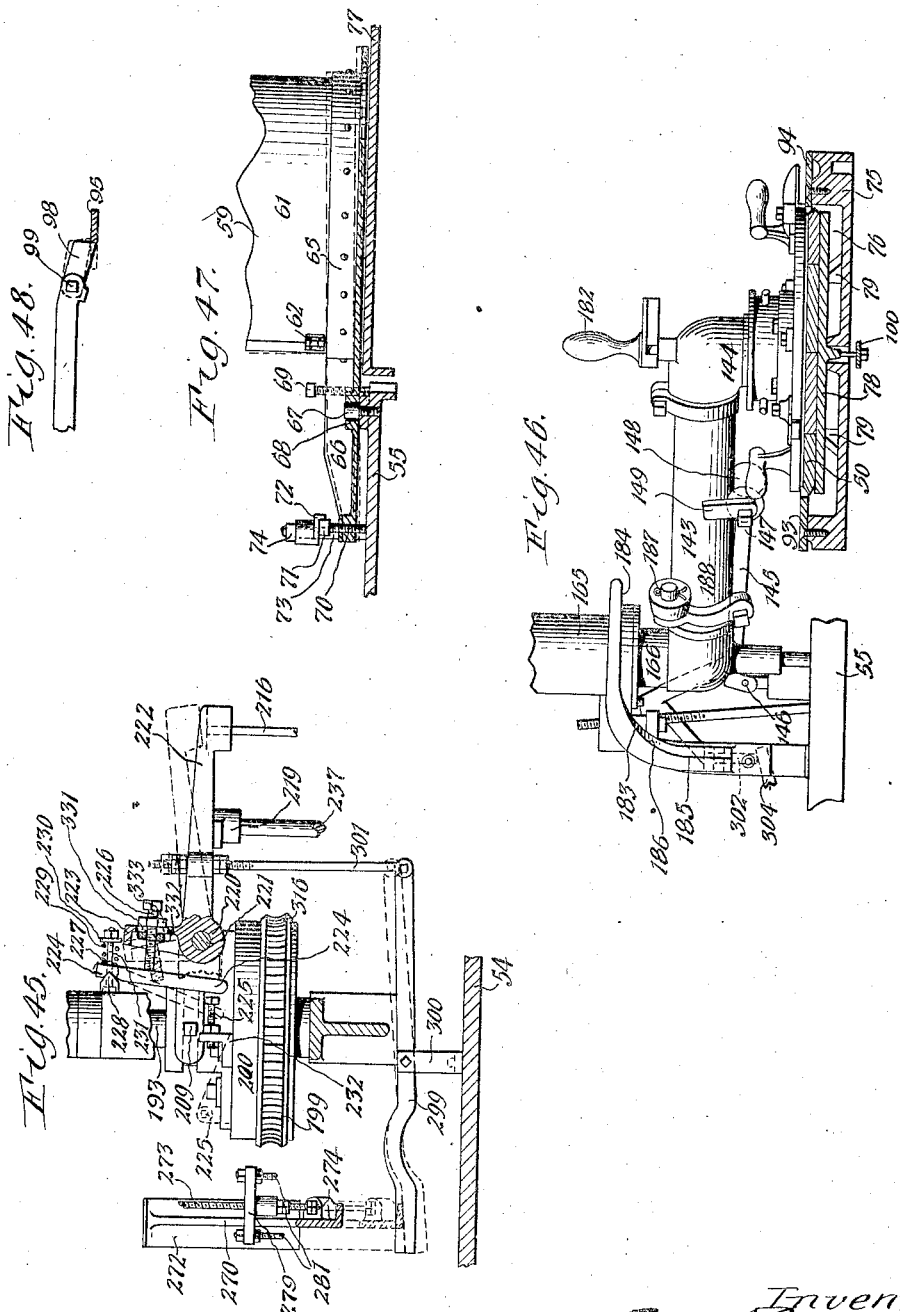

Patented Dec. 21, 1926.

1,611,577

UNITED STATES PATENT OFFICE.

EDWIN F. BEUGLER, OF BUFFALO, NEW YORK, ASSIGNOR TO E. & B. HOLMES MACHINERY CO., OF BUFFALO, NEW YORK, A CORPORATION OF NEW YORK.

MACHINE FOR MAKING BARRELS.

Application filed January 9, 1924. Serial No. 685,286.

This invention relates to a machine for making barrels of the type in which the body is composed of a plurality of longitudinal staves and hoops surrounding the staves, and the heads are each constructed of one or more sections having the form of a circular disk and secured with its edge in a croze in the staves at the respective end of the barrel body.

The objects of this invention are to provide improved means for holding a stack of barrel heads; improved means for transferring these heads one at a time into the previously assembled barrel bodies; improved means for compressing the staves at each end of the barrel body around the respective head preparatory to applying a hoop thereto; improved means for driving or hammering the end hoop at each end of the barrel downwardly for holding the staves in engagement with the respective head; and to provide various instrumentalities of a novel character for operating each of these devices and to produce automatic cooperation between the same.

Figure 1:
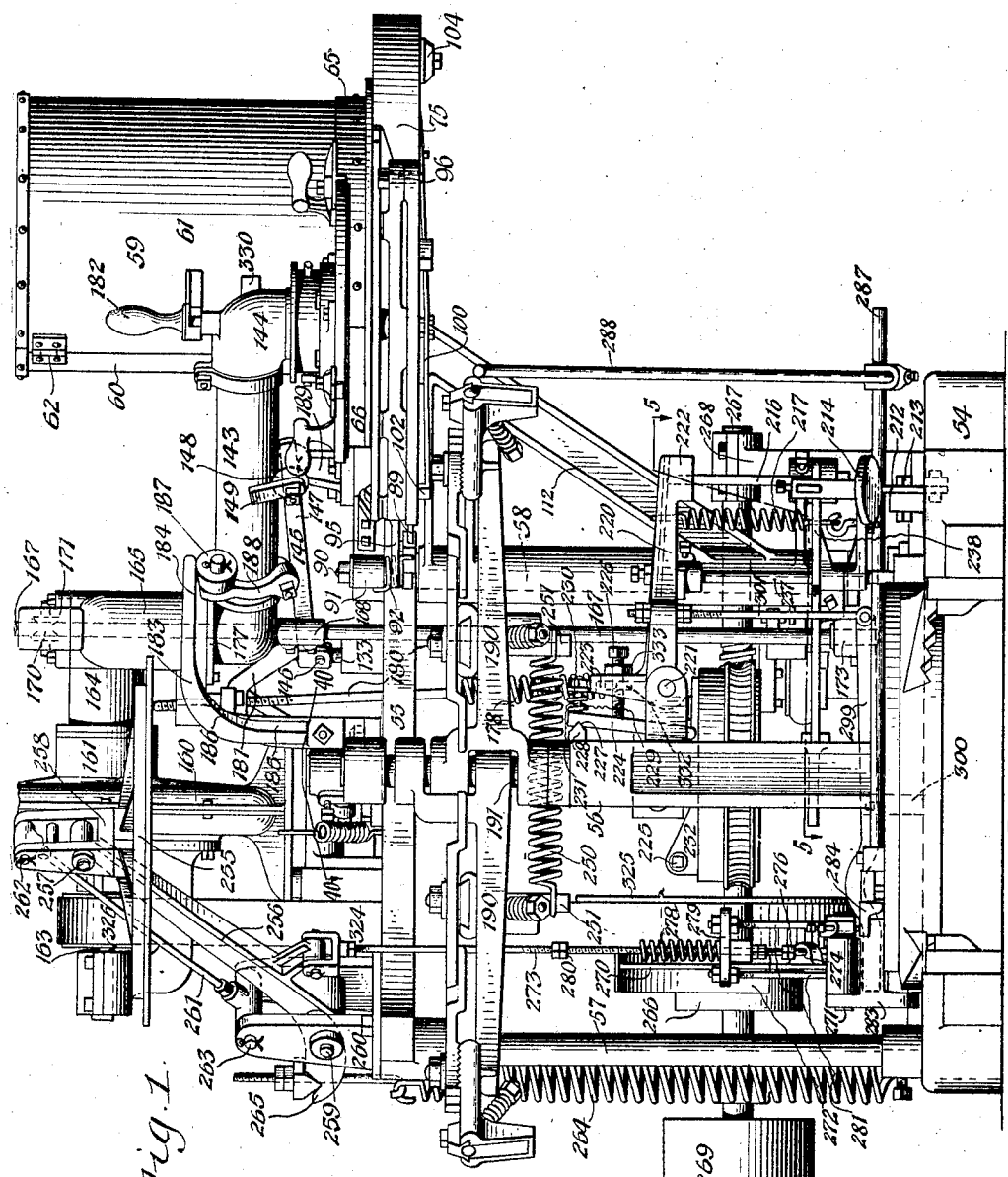
Figure 2:
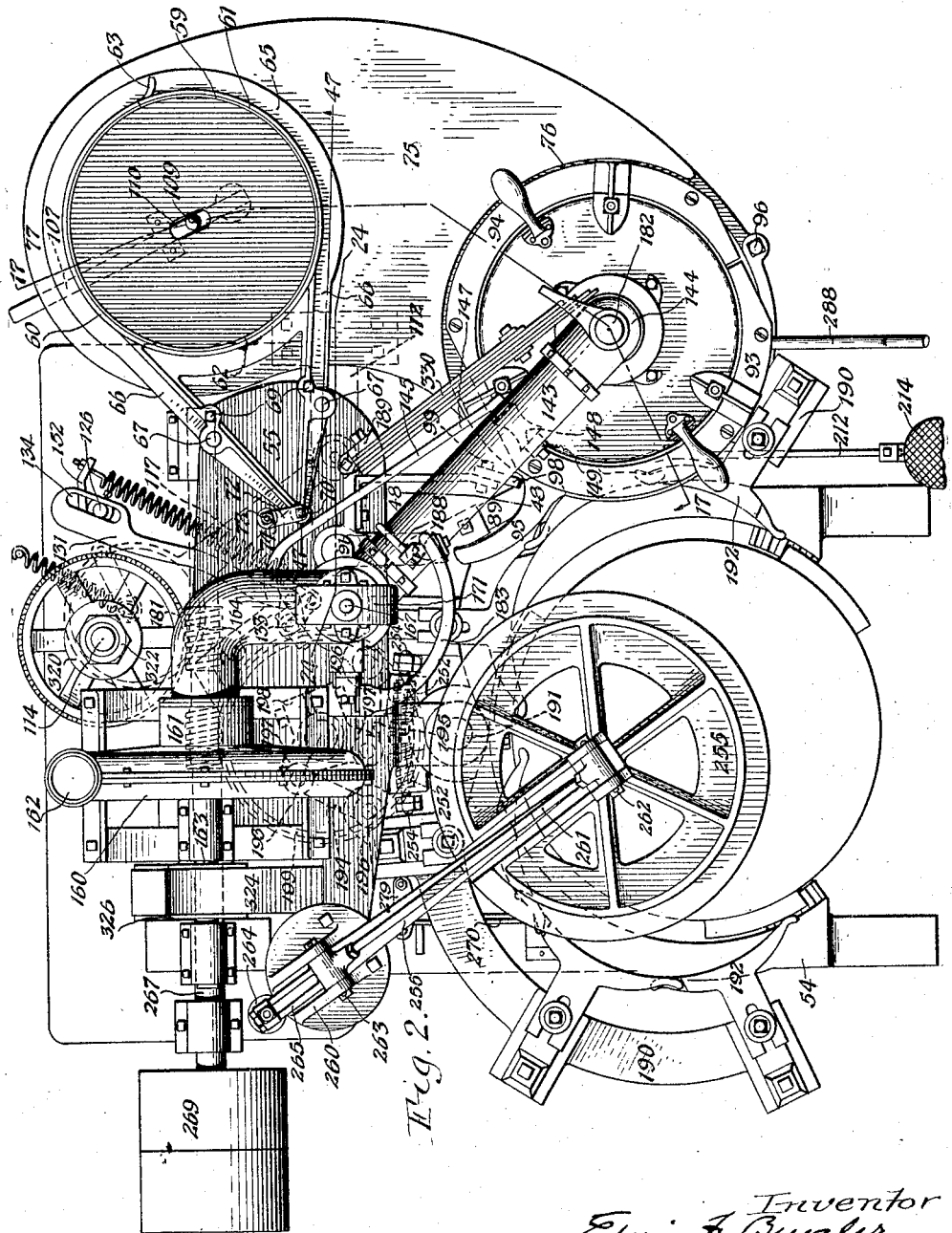

In the accompanying drawings:

Figure 1 is a front elevation of my improved barrel making machine showing the parts in the position which they occupy preparatory to placing a barrel body in the assembling position and preparatory to carrying a barrel head from the transfer position to the barrel assembling position. Figure 2 is a top plan view of the same. Figure 3 is a side elevation thereof viewed from the right hand side. Figure 4 is a fragmentary horizontal section taken on line 4—4, Figure 3. Figure 5 is a fragmentary horizontal section taken on line 5—5, Figure 1. Figure 6 is a fragmentary horizontal section, on an enlarged scale, taken on line 6—6, Figure 8. Figure 7 is a fragmentary perspective view of part of the mechanism for controlling the clutch, whereby power is transmitted to the barrel body compressor and associated parts. Figure 8 is a vertical section, on an enlarged scale, taken on line 8—8, Figure 5. Figure 9 is a fragmentary top plan view showing the head carrying mechanism in the position in which the same is supporting a barrel head within the upper end of the barrel body preparatory to compressing the staves around the same. Figure 10 is a sectional front elevation of the same. Figure 11 is a fragmentary vertical transverse section, taken on line 11—11, Figure 9. Figure 12 is a fragmentary vertical longitudinal section taken on line 12—12, Figure 9. Figures 13 and 14 are horizontal sections, on an enlarged scale, taken on the correspondingly numbered lines in Figure 12. Figure 15 is a fragmentary top plan view of the machine showing the feeding mechanism which transfers the barrel heads one at a time from the magazine to the pneumatic carrier in a position in which this feeding mechanism receives a barrel head from the magazine. Figure 16 is a fragmentary plan view of the heading feed mechanism, partly in section, and showing the means whereby the barrel head is centered on the heading feed mechanism after the latter receives a head from the magazine and preparatory to presenting this head to the pneumatic head carrier. Figure 17 is a fragmentary vertical longitudinal section taken on line 17—17, Figure 2 and showing the position of the parts in which the heading feed mechanism is supporting a barrel head in position to be engaged by the pneumatic carrier. Figure 18 is a similar view showing the heading feed mechanism about to complete its rearward stroke preparatory to receiving a barrel head from the magazine, the sectional part of the heading feeder being taken on line 18—18, Figure 16. Figure 19 is a similar view showing the heading feed mechanism in its rearmost position in alinement with the heading magazine and the lowermost barrel head of the stack within the latter transferred to the heading feeder, this section being taken on line 19—19, Figure 15. Figure 20 is a fragmentary vertical section, on an enlarged scale taken on line 20—20, Figure 16, and showing the drop plate or platen of the heading feed mechanism in its depressed position preparatory to being elevated. Figure 21 is a similar view showing the drop plate turned part way about its vertical axis and elevated into a position in which the same is flush with the heading feed table. Figure 22 is a similar view showing the drop plate of the heading feed mechanism turned another step about its vertical axis and again dropped into its lower position so that its upper side is below the plane of the heading feed table. Figure 23 is a fragmentary vertical longitudinal section similar to Figure 17 and showing the means which elevate the stack of heading therein so as to permit the ready withdrawal from the stack of the wires, ties or binders whereby the heading is tied together for transportation and storage. Figure 24 is a fragmentary vertical section taken on line 24—24, Figure 2 and showing the rocking support for the heading feed table and associated parts. Figure 25 is a fragmentary horizontal section taken on line 25—25, Figure 3 and showing the clutch mechanism which operates the heading feed mechanism in its inoperative position. Figure 26 is a similar view but showing this clutch mechanism in its operative position preparatory to beginning a cycle of operations of the heading feed mechanism. Figure 27 is a similar view showing the position of this clutch mechanism when the heading feed table has been moved with its head receiving part from the pneumatic carrier to the heading supply magazine. Figure 28 is a fragmentary side view of this clutch mechanism viewed from that side taken along line 28—28, Figure 25, and showing the trip link or bar of this clutch mechanism in a position which it occupies preparatory to operating the latter for coupling the heading feed mechanism with the driving mechanism. Figure 29 is a similar view showing the position of the trip link or bar in the position which it occupies after tripping the heading feed clutch and is about to move into a position which will permit the coupling member of this clutch to return to a position in which it will automatically uncouple the same. Figures 30 and 31 are perspective views of part of the trip link or bar and the coupling hook or dog of the clutch which operate the heading feed mechanism shown in Figures 25 to 29. Figure 32 is a fragmentary horizontal section taken on line 32—32, Figure 3. Figure 33 is a fragmentary vertical section, on an enlarged scale, taken on line 33—33, Figure 3. Figure 34 is a fragmentary horizontal section taken on line 34—34, Figure 3 and showing the barrel body compressor mechanism in its operative position. Figure 35 is a fragmentary sectional side elevation of the machine viewed from the side opposite to that shown in Figure 3 and showing in an operative position the mechanism which drives or hammers the upper end hoop down upon the barrel body. Figures 36 and 37 are fragmentary vertical longitudinal sections taken on the correspondingly numbered lines in Figure 4, and showing the parts in the position which they occupy when the hoop driver or hammer mechanism is in its inoperative position. Figure 38 is a view similar to Figure 36, but showing the parts in the position which they occupy when the hoop driver or hammer is in its operative or depressed position. Figure 39 is a fragmentary vertical transverse section taken on line 39—39, Figure 4. Figure 40 is a fragmentary plan view taken on line 40—40, Figure 1 and showing the position of the means which operate the heading carrier when the pneumatic gripper of this carrier is in its elevated position and the body compressor arms are in their open or inoperative position. Figure 41 is a similar view showing the position of these parts when the body compressor mechanism is in its closed position. Figure 42 shows the position of these parts after the compressor mechanism has completed the compression of the staves around a barrel head and the pneumatic gripper of the head carrier is being depressed for the purpose of picking up a barrel head which is to be inserted in the next following barrel body. Figure 43 is a fragmentary vertical section taken on line 43—43, Figure 40 and showing the parts in the corresponding position. Figure 44 is a section taken along the same line as Figure 43, but showing the parts in the position corresponding to Figure 42. Figure 45 is a fragmentary vertical transverse section taken on line 45—45, Figure 3 and showing part of the mechanism for automatically operating the clutch which couples and uncouples a constantly rotating driving member with the mechanism which operates the barrel compressor and associated parts. Figure 46 is a fragmentary sectional front elevation of the machine, similar to Figure 1, but showing the pneumatic gripper of the heading carrier in its depressed position and in engagement with the head which has been presented thereto at the heading transfer position by the heading feed mechanism. Figure 47 is a fragmentary vertical transverse section taken on line 47—47, Figure 2 and showing the means for supporting and adjusting the heading magazine on a stationary part of the machine. Figure 48 is a fragmentary vertical section taken on line 48—48, Figure 2 and showing the trip dog and associated parts for opening the centering device of the heading feed mechanism.

Similar characters of reference indicate like parts in the several views.

In its general organization this machine comprises a magazine which is adapted to contain a stack or pile of barrel headings 50, a heading feed mechanism whereby these barrel heads are fed off successively from the bottom of the pile in the magazine and presented to a transfer position, a pneumatic carrying mechanism which operates to grip each of the barrel heads after the same reach the transfer position and carry the same to the upper end of the previously assembled barrel body which is arranged at the barrel assembling position of the machine, means for compressing the upper ends of the staves 51 of the barrel body around the head, and causing the croze 52 of the staves to engage with the edge of the head, and means for driving or hammering an end hoop 53 around the staves after the same have been compressed so as to confine the barrel head within the same.

The main frame of the machine which supports the various working or movable parts may be variously constructed, but in the preferred form which is shown in the drawings, the same comprises a base 54, an elevated shelf 55 arranged at a suitable height above the base, a central post or standard 56 rising from the central part of the base, and upright side posts 57, 58 connecting the base and shelf on one side of the central post and arranged transversely in line with each other or substantially so in a direction crosswise of the machine.

*Heading magazine.*

The mechanism which supports a pile, tier or stack of barrel heads in position to be fed off one at a time from the bottom of this stack to the means which subsequently assemble these heads with the body of the barrel is constructed as follows:

The numeral 59 represents an upright magazine or hopper which is preferably of cylindrical form and adapted to receive an upright stack, tier or pile of barrel heads 50. The internal diameter of this magazine is preferably somewhat larger than the diameter of the heads which are stored therein so as to permit this pile to drop by gravity and bring the lowermost head successively to the underside of the pile as the heads are fed off one at a time from this end of the same. For this purpose the lower end of this magazine is open so as to permit the barrel heads to pass downwardly out of the magazine. The upper end of this magazine is also preferably left open.

If desired the barrel heads may be introduced into the open upper end thereof, but for greater convenience this magazine is divided lengthwise and diametrically so as to permit its semi-cylindrical sections 60, 61 to be moved apart and enable a pile of heads to be introduced horizontally therebetween whenever the supply requires replenishment. For this purpose the two inner longitudinal edges of the two sections of the magazine are pivotally connected by means of vertical hinges 62, 62 which permit one of these sections to swing horizontally toward and from the other for the purpose of closing the magazine into cylindrical form or opening the same to permit of the introduction of a supply of barrel heads. Various means may be provided for holding the sections of the heading magazine in their closed position, for instance, a hook or catch 63 arranged on one of the sections and adapted to engage with a lug or projection 64 on the opposing part of the other magazine section, as best shown in Figure 3.

In order to support this magazine and permit free access to its lower end by the heading feed mechanism, supporting means are provided which connect this magazine with the adjacent part of the shelf, these supporting means being preferably so constructed that they permit the magazine to be adjusted vertically in order to bring the lower end of the same into the proper relation to the heading feed mechanism. For this purpose the magazine supporting mechanism is constructed as follows:

Supported upon the shelf and secured to the magazine is a supporting arm which in its preferred form comprises an outer ring 65 which is arranged below the lower end of the magazine, two horizontal bars 66 converging inwardly from the front and rear parts of this ring and pivotally supported with their intermediate parts on the shelf, while their inner ends are connected with each other and are adapted to be engaged by a thrust device. In the preferred construction the ring 65 of this supporting arm in effect forms part of the lower end of the magazine and one of the magazine sections, for example, the front section 60 is rigidly secured at its lower end to the adjacent part of the supporting arm ring while the rear section 61 is disconnected from this ring so as to permit of opening and closing the magazine for the purpose previously described. The pivotal connection between this supporting arm and the frame is produced by two upright studs 67 which are arranged side by side on the shelf and project upwardly into openings 68 in the central parts of the supporting arm. The fit between these studs and openings is sufficiently loose so as to permit this arm to be rocked vertically on the shelf and thus enable the lower end of the magazine to be adjusted relatively to the mechanism which feeds off the heading from the stack therein. This adjustment of the supporting arm may be effected in various ways, but as shown in the drawings, see particularly Figures 2, 15 and 47, the same consists of two outer adjusting screws 69 which pass through the bars 66, 66 adjacent to the outer sides of the studs 67 and engage at their lower ends with the top of the shelf 55 and a single inner adjusting screw 70 which passes through a threaded opening at the inner ends of the bars 66, 66 and engages its lower ends with the top of the shelf 55 while the head 71 at its upper end engages with the underside of an abutment or thrust member mounted on the adjacent part of the shelf. This abutment in its preferred construction has the form of a horizontally swinging arm 72, the free end of which engages over the inner adjusting screw 70 while its hub is pivoted on the upper part of a stud or pin 73 rising from the adjacent part of the shelf, which stud or pin is provided at its upper end with a screw nut 74 engaging with the upper side of the hub of the thrust arm 72. For the purpose of lowering the magazine vertically, the outer adjusting screws 69 are slackened and the inner adjusting screw 70 is tightened and upon operating these adjusting screws in the manner reverse to that just described, the magazine can be raised. It is therefore possible, by these means, to adjust the magazine vertically so that its lower end stands in exactly the right position relatively to the means which feed the heading from the bottom of the pile. By means of the two outer adjusting screws 69, 69, it is also possible to tip the magazine so as to properly aline its lower end relatively to the heading feed mechanism, this being accomplished by tightening one of these outer adjusting screws and slackening the other. The function of the thrust arm 72 is to hold the yoke in engagement with the studs 67 and permit of the ready removal of the magazine from the table when this becomes necessary for inspecting, adjusting, or repairing the machine. When it is desired to remove the magazine for any purpose, this can be readily done by first loosening the screw nut 74 of the thrust pin 73 then turning the thrust arm 72 horizontally away from the upper end of the inner adjusting screw 70 after which the yoke together with the heading magazine can be readily lifted off from the fulcrum studs or pins 67 and again reapplied thereto for resuming operation of the machine.

*Heading feed mechanism.*

From the underside of the heading magazine, the barrel heads are fed off one at a time and carried to a transfer place where the heads are successively presented to the underside of a gripper forming part of the carrying mechanism, whereby the heads are subsequently carried to the place where the body and heads are assembled. This heading feed mechanism in its preferred form is constructed as follows:

The numeral 75 represents a horizontal heading feed table which moves back and forth between the underside of the magazine and the transfer place above referred to. This feed table preferably swings about a vertical pivot and the same is provided on its front part with a depressed pocket 76 while its rear part is elevated and forms a flat horizontal shutter or supporting surface 77. Upon moving the feed table rearwardly until the pocket thereof is vertically in line or registers with the lower end of the magazine, the pile of barrel heads will drop by gravity so that the lowermost head of this pile will enter this pocket while upon moving the feed table forwardly, the lowermost barrel head within this pocket will be carried away from the underside of the pile and the elevated horizontal shutter portion of the same will sweep across the underside of the magazine and engage with the underside of the next following lowermost barrel head of the stack and prevent the same from dropping. For the purpose of preventing the lowermost barrel head of the stack in the magazine from dropping into the pocket until after the latter is in complete register with the magazine a drop plate or platen 78, preferably of disk form, is provided which is arranged in the pocket. This plate is actuated by means which are so timed that the same will be permitted to descend by gravity under the weight of the pile of barrel heads after the heading receiving pocket of the feed table is axially in line with the heading magazine and remains in this position during the entire forward stroke of the heading feed table, but is again elevated during the backward stroke of this table so that its upper side is flush with the top of this table. The preferred means for this purpose which are shown in the drawings comprise a plurality of lower cams 79 arranged in an annular row on the feed table at the bottom of the heading receiving pocket and each provided with a horizontal upper side 80, an inclined rear side 81 and a vertical or abrupt side 82, and a plurality of upper cams 83 arranged in an annular row on the underside of the drop plate or platen and each provided with a horizontal underside 84, an inclined front side 85 and a vertical or abrupt rear side 86, as best shown in Figures 20 and 21. Adjacent to the outer side of each of the cams on the drop plate, the same is provided on its underside with a ratchet tooth or pin 87 which latter is adapted to be engaged by a ratchet hook 88 formed at the rear end of a ratchet pawl or dog 89 pivoted by means of an upright pin 90 on a bracket 91 forming part of the main frame, this ratchet pawl being constantly pressed in a direction toward the path of the ratchet teeth or pins 87 by means of a spring 92 surrounding the pivot 90 and connected at its opposite ends with the ratchet pawl 89 and the bracket 91, as best shown in Figures 15 and 16. At the end of the forward stroke of the feed table, the hook of the ratchet pawl or dog trips or snaps over the rear side of the adjacent ratchet pin 87, as shown in Figure 16, at which time the drop plate is in its depressed position by reason of the upper cams on its underside having dropped off from the lower cams of the feed table and being arranged in the spaces therebetween.

During the backward movement of the heading feed table, the ratchet pawl 89 maintains its hook 88 in engagement with the respective tooth 87 on the underside of the drop plate, so that the latter while being carried rearwardly with this feed table is turned about its vertical axis by reason of the detaining effect produced by the connection between this drop plate and this pawl 89. During this turning movement of the drop plate, the inclined front side of each of its cams 83 engages with the corresponding inclined rear side of the cams 79 on the heading feed table so that this drop plate is elevated until the horizontal underside of the upper cams on this drop plate engage with the horizontal upper sides of the lower cams on the heading feed table at which time the upper surface of this drop plate is flush with the upper side of the rear or shutter portion of this feed table, as shown in Figure 18. This rotary movement of the drop plate continues after the same is elevated until the heading receiving pocket of the feeding table is axially in line with the heading magazine, at which time the abrupt rear sides of the plate cams pass beyond or clear the abrupt front sides of the table cams, so that now the drop plate will descend by gravity together with the pile of barrel heads resting thereon, whereby the lowermost head of the stack will enter the pocket of the feeding plate, as shown in Figure 19. The drop plate remains in this lowered position during the entire forward stroke of the heading feed table, whereby the barrel head in this pocket will be carried away from the underside of the pile and the elevated rear shutter portion of the feeding table will pass across the lower end of the magazine and support the underside of the pile of heads therein, while the barrel head which has just been removed therefrom is presented to the gripper of the carrying mechanism, as shown in Figure 17, preparatory to being transferred to the barrel assembling plates.

During this forward movement of the feeding table the disk turning dog 89 trips with its hook past the next following ratchet tooth 87 of the drop plate and engages with the rear side thereof preparatory to turning this drop plate another step and elevating the same during the subsequent backward stroke of the feeding table, as previously described.

Heading centering device.

Inasmuch as the sudden descent of the drop plate or platen under the weight of the pile of barrel heads resting thereon is liable to displace the lowermost barrel head which is removed from the pile, means are provided for successively centering the lowermost heads on the drop plate regardless of whether the same is made of one or more pieces so that it is in the proper position to be carried away subsequently by the gripper of the mechanism which transfers these heads to the barrel assembly place.

In its preferred form, this centering device comprises two curved jaws 93, 94 which are arranged around the upper part of the heading receiving pocket in the feed table and the drop plate therein, the rear one 94 of these jaws being preferably fixed on the adjacent part of this table while the front jaw 93 is mounted thereon, so as to be movable horizontally toward and from the fixed jaw for the purpose of opening and closing the centering device and thus permit each barrel head to descend freely with the drop plate, while the centering device is open, but this movable centering jaw is released and permitted to swing toward the fixed companion jaw as the drop plate reaches its lowermost position and thereby cause the head which has been deposited upon the drop plate to be centered thereon. The movable centering jaw 93 is mounted on a horizontally swinging lever or arm 95 which is pivoted at one end by means of an upright pin 96 on the heading feed table adjacent to one of the corresponding ends of the fixed and movable centering jaws. A spring 97 is provided which connects the arm of the movable centering jaw with a part of the feed table, and a trip pawl or dog 98 is mounted by means of a horizontal pivot pin 99 on a stationary part of the machine so that during the last part of the forward movement of the heading feed table, the free end of the centering jaw arm 95 will move freely past the underside of the dog 98 and lift the same until this arm has passed this dog and stands in front of the free front end of the same, as shown by full lines in Figures 16 and 48. This movable centering jaw is held in this open position during the backward or idle stroke of the heading feed table, by a detent device which in its preferred form, as shown in Figures 17, 18 and 19, comprises a vertically swinging detent or locking lever 100 pivoted by means of a screw 101 to the underside of the heading feed table so as to swing vertically and provided on one of its arms with a detent lug or nose 102 which is adapted to engage with the inner side of the centering arm 95 and also provided with a tappet 103 having the form of a screw which projects upwardly through the bottom of the pocket in the heading feed table and into engagement with the underside of the drop table, while the other end of this detent lever is provided with a weight 104 which tends constantly to turn this lever in the direction for raising the detent 102 thereof into the path of the centering lever or arm 95. During the backward movement of the heading feed table, the centering jaws are open and the same are maintained in this relation by engagement of the detent 102 which is shifted at this time into its uppermost position and engages with the inner side of the centering lever 95, as shown in Figure 18. When, however, the feed table has been moved into its rearmost position and the drop plate in its pocket descends together with a barrel head resting thereon, this drop plate by engagement with the tappet of the detent lever 100 depresses that arm of the latter which carries the detent or nose 102 whereby this nose is carried downwardly away from the inner side of the centering lever and permits the latter to be moved inwardly under the action of the spring 97 so as to produce a centering effect upon the respective barrel head by cooperation of the movable jaw on this lever with the fixed jaw on the heading feed table, this position of the parts being represented in Figure 19. The spring 97 connects the centering lever with an adjacent part of the heading feed table.

The centering jaws remain in this operative position around the barrel head during the entire forward movement of the heading feed table and while this head is removed therefrom at the transfer place by the gripper of the carrying device, thereby ensuring holding of the head in the proper position for subsequent assemblage with the body of the barrel. During the last part of the forward movement of the heading feed table the free end of the centering arm or lever trips past the trip dog 98 without being affected thereby, but during the first part of the subsequent rearmost movement of the heading feed table, this dog by standing in the path of the centering arm 95 causes the latter to be detained and swung outwardly so that the jaw 93 thereof is moved away from the companion fixed jaw 94 and the centering device as a whole is opened preparatory to receiving the next following barrel head at the inner end of the subsequent backward stroke of the heading feed table. As the centering arm or lever 95 is swung into its open position, the same is automatically locked thereat by the nose of the detent lever 100 which at this time is automatically raised by the weight 104 so that it stands in the path of the centering lever and engages with the inner side of the same, as shown in Figure 18, whereby the movable centering jaw is prevented from closing after the heading feed table has moved rearwardly far enough to cause the free end of the centering lever to clear the trip pawl 98.

Heading lifting device.

In practice the barrel heads are usually put up in packages which are fastened together by ties or binders 106 of wire or other suitable material, as shown in Figure 23. These packages are usually placed into the magazine before the ties are removed therefrom and in order to permit of withdrawing these ties from the packages easily and conveniently means are provided which permit of temporarily lifting the piles or packages of heading before the operation of feeding off the heads from the underside thereof is begun. This is preferably accomplished by providing the elevated rear or shutter portion of the heading feed table with a vertical swinging lifting lever 107 which is pivoted by means of a cross piece 108 on the underside of this part of the table and provided on its front arm with a weight 334 which tends constantly to turn this lever so that its front arm descends and also with an upwardly projecting lifting pin 109 which extends through an opening 110 arranged in that portion of the table supporting the underside of the pile of barrel heads while this table is in its foremost position. Whenever a package of tied barrel heads is placed within the magazine with its lower end resting upon the rear or shutter portion of the feeding table, as shown in Figure 23, the ties around the package are first cut and then the operator depresses the handle 111 on the rear arm of the lifting lever whereby the pin 109 on the front arm thereof by engaging with the underside of the package of heading will elevate the latter and permit the severed ties 106 to be pulled out from underneath the package or pile and thus leave the same free, so that the several heads can be successively fed from the underside of the pile in the manner previously described.

Means for operating heading feed table.

In the preferred manner of mounting the heading feed table the same is secured to the upper end of the horizontally swinging bracket 112, which latter is pivotally mounted with its inner part on the post or rod 58 which forms a part of the main frame of the machine, as shown in Figure 24. A rocking movement is imparted to this bracket together with the heading feed table mounted thereon by means which preferably derive their power from a continuously rotating driving disk 113 which is journaled on the upper part of an arbor 114 mounted in an upright position on the rear part of the base of a frame. The coupling of the heading feed table shifting mechanism and this driving disk is automatically controlled by the movement of the gripper mechanism as the latter moves a barrel head from the transferring position of the heading feed table to the place where the head is assembled with the body of the barrel. This mechanism, as best shown in Figures 1, 2, 3, 4, 12 and 25 to 33 is constructed as follows:

The numeral 115 represents an eccentric mounted on the arbor 114 and surrounded by an eccentric strap 116 which forms part of a link 117 pivotally connected with a rock arm 118 on the lower part of the rocking bracket 112 which carries the heading feed table. On the upper side of this eccentric is mounted a coupling pawl or dog 119 by means of a vertical pin 120 so that a coupling hook 121 on one end of this pawl can be moved into the path of an annular row of coupling or clutch pins 122 which are mounted on the driving disk 113. This coupling dog is moved in this direction by means of a spring 123 which connects the rear end or tail 124 of this dog with an adjacent part of the eccentric. The coupling dog 119 is held in its inoperative position in which the coupling hook 121 of the same is moved out of the path of these coupling pins by means of a trip or releasing pawl 125 which is connected at its outer end with an upright shaft or pin 126 journaled in a bearing 127 on the adjacent stationary part of the machine while its hook 128 is adapted to be moved horizontally into and out of the path of the tail 124 of the coupling dog. This trip pawl or dog is yieldingly moved in a direction for carrying its hook 128 into the path of the tail of the coupling dog 119 by means of a spring 129 which is connected at one end with an arm 130 on the shaft 126 while its other end is secured to a part of the main frame as shown in Figure 33. The numeral 131 represents a trip link or releasing bar which is pivotally connected at its front end with a trip arm 132 on an upright trip shaft 133 journaled on the main frame, while its opposite end is provided with a longitudinal slot 134 which receives the upper end of the shaft 126 of the trip pawl and the same is also provided on its underside with a releasing lug or shoulder 135 adapted to engage with a corresponding releasing lug 136 on the adjacent part of the trip pawl and also provided with a restoring lug 137 having an inclined face 138 adapted to engage with a corresponding inclined face 139 on a restoring lug 140 of the trip pawl, and a horizontal face 141 adapted to engage with a corresponding horizontal face 142 on the said trip pawl. When the machine is at rest, the heading feed table is in its foremost position, and the coupling dog 119 of the eccentric 115 is disconnected from the coupling pins on the constantly rotating driving disk, as shown in Figure 25. Upon turning the trip shaft 133 in the direction of the arrow associated therewith in Figure 26, the releasing bar or link 131 brings its releasing lug 135 into engagement with the releasing lug 136 of the trip pawl and turns the latter in the direction for disengaging its trip hook from the tail 124 of the coupling pawl whereby the hook of the latter is permitted to turn into the path of the coupling pins 122 and to engage one of the same under the action of the spring 123, as shown in Figure 26. The eccentric 115 is now coupled to turn with the driving disk 113 and during the first half of this rotary motion, the rock arm 118 is shifted from the position shown by dotted lines in Figure 27 to the position shown by full lines in the same figure whereby the heading feed table is moved from its foremost position, shown in Figure 2, to its rearmost position shown in Figure 15. During the last part of the forward movement of the releasing link or bar 131 the inclined front side of its restoring lug 141 engages with the inclined rear side of the restoring lug 140 on the trip pawl 125, as shown in Figure 29, whereby this link is elevated and by the time the same reaches its foremost position, the same has been elevated sufficiently to disengage its releasing lug 135 from the corresponding releasing lug 136 on the trip pawl so that the latter is free to be moved by the spring 129 into a position in which its releasing hook stands in the path of the tail on the coupling pawl so that when the latter completes one rotation with the eccentric on which the same is mounted, the tail of this coupling dog will engage with the hook of the trip or releasing pawl 125 and be turned thereby so that the hook of the coupling pawl will be disengaged from the respective coupling pin 122 and thereby disconnect the eccentric from the driving disk, thereby arresting the further movement of the heading feed table which occurs at the front end of its forward stroke. During the reverse rocking movement of the trip shaft 133 in the direction opposite to that of the arrow associated therewith in Figure 26, the link 131 which moves rearwardly in harmony therewith rides with its restoring lug 137 backwardly and downwardly over the restoring lug 140 of the trip pawl and at the same time the releasing lug 135 of this bar drops from the top of the releasing lug 136 on the trip pawl into a position in rear of the same, as shown in Figure 28, so that these parts are in their proper relative position for again disengaging the trip pawl 125 from the coupling dog 119 during the next forward movement of the releasing link upon turning the trip shaft 133 in the proper direction.

*Heading transferring or carrying mechanism.*

The carrier mechanism which transfers each of the barrel heads from the transfer position of the heading feed mechanism to the barrel assembling position and cooperates with the clutch mechanism which controls the movement of the heading feed table comprises a gripper having a horizontally swinging and vertically movable suction or exhaust pipe or conduit 143 which is provided at its front end with a downwardly projecting suction head 144, the open lower end or mouth of which is adapted to engage with the upper side of the barrel head supported upon the drop plate of the heading feed mechanism while the feed table thereof is in its foremost position and pneumatically grip said barrel head, lift the same from the heading feed mechanism and carry the same horizontally to a position in which this head is arranged vertically over the body of the barrel, and then lower this head into the upper end of the barrel body preparatory to fastening the same therein as will presently appear. This pneumatic gripper or suction head may be variously constructed, but in the preferred form the same is constructed along the general lines shown in the application for patent Serial No. 619,253 filed by myself February 15, 1923, and also in the application for patent Serial No. 537,102 filed by myself February 16, 1922, to which applications reference may be had for a more complete description of this pneumatic gripper mechanism.

For the present purpose only the horizontally swinging movement of the horizontal suction pipe or conduit of the pneumatic transfer mechanism is utilized for controlling the operation of the heading feed mechanism, and for this purpose a horizontal operating lever 145 is employed which is connected with the upper end of the trip shaft 133 by means of a horizontal pivot 146, as shown in Figures 1, 12 and 14 and its front arm 147 is arranged lengthwise adjacent to the suction pipe 143 and provided at its front end with a concave roller 148 which engages with the cylindrical underside of this pipe and the same is also provided with an upwardly projecting tappet or finger 149 which engages with the front side of this suction pipe. The tension of a spring 150 connected at one end with an arm 151 on the trip shaft and at its other end with a fixed arm 152 tends to turn the trip rod or shaft 133 constantly in the direction opposite to the arrow associated therewith in Figure 26, so that this spring operates through the medium of the operating lever 145 to move the suction pipe and gripper head backwardly and hold the same yieldingly in a position in which the mouth of the gripper head stands over the barrel head while the heading feed table is in the transfer position. It, therefore, follows from this construction that whenever the suction pipe and gripper head of the heading carrier mechanism are moved horizontally forward from the transfer position for the purpose of transferring a barrel head from the heading feed table to the barrel assembly position, that the suction pipe by engagement with the finger or tappet 149 will also turn the trip shaft 133 in the same direction, whereby the trip link 131 will be moved forwardly for the purpose of disengaging the trip pawl from the coupling dog and enable the eccentric to be coupled with the constantly rotating driving disk. By this means the heading feed table will be caused to move from its foremost position to its rearmost position and then carry a barrel head from the magazine forwardly to the transfer position while the previously fed off barrel head is being moved by the pneumatic carrying mechanism from the transfer position to the barrel assembling position, so that when the pneumatic gripper head returns to its rearmost position, a new barrel head will be present thereat preparatory to being carried in like manner to the next following barrel body.

In order to ensure arresting the eccentric in a definite position when the same has completed one rotation and thus ensure arresting the heading feed table at the front end of its stroke with its head receiving pocket axially in line with the pneumatic gripper head of the carrier mechanism a centering device is provided which in its preferred form, as shown in Figures 3, 32 and 33 preferably comprises a centering disk 154 which is formed on or secured to the eccentric and provided with a concentric dwell surface 155 and a notch 156 in one part thereof, and a centering roller 157 which is mounted on a horizontally swinging arm 158 pivoted on an adjacent stationary part of the machine and constantly moved in the direction for engaging this centering roller with the periphery of the centering disk by means of a spring 159. When the heading feed table is in its foremost position and its head receiving pocket is axially in line with the pneumatic gripper head of the carrying mechanism, the centering roller 157 engages with the notch 156 of the centering disk and when this eccentric is turned for moving the heading feed table backwardly and forwardly this centering disk makes one complete rotation whereby the centering roller is first ejected from said notch, then caused to travel along the concentric or dwell surface of this disk, and then permitted to reengage this notch at the end of one rotation of this eccentric. By reason of the constant pressure of this centering spring the roller 157 upon engaging this notch 156 will tend to either complete the rotation of the eccentric or to retard the same as may be necessary and thereby prevent the eccentric from either throwing over or throwing under but compelling the same to come to rest in a position in which the heading feed table is properly alined in its foremost position with the gripper head of the carrying mechanism.

The mechanism for exhausting the air through the conduit 143 and the pneumatic gripper or suction head 144 of the carrying mechanism which has been previously described and the means for mounting and operating the same are constructed as follows:

Upon the central part of the upper side of the shelf is arranged an air exhausting device which preferably is constructed in the form of a fan having a casing 160 mounted on the shelf and having an axial air inlet or eye 161, a peripheral outlet 162 for the air and a horizontal driving shaft 163 for rotating the fan blades within the casing. The numeral 164 represents an intermediate air conduit which has its outlet end connected with the eye of the fan casing, while its inlet end is constructed in the form of a downwardly projecting tubular nozzle 165, as best shown in Figure 12. The rear end of the horizontally swinging air conduit 143 of the pneumatic gripper is provided with an upwardly turned hollow or tubular shank 166 which is arranged within the downwardly projecting inlet nozzle of the intermediate air conduit. This tubular shank and nozzle are movably connected so that the suction pipe or conduit 143 of the gripper can both turn horizontally about this nozzle as a vertical axis and also move vertically during which time the shank of the gripper pipe 143 turns in the nozzle and also reciprocates vertically therein. In order to enable these parts to move freely relatively to each other and permit the same to be shifted with a minimum amount of power, anti-friction means are provided which preferably comprise an upright cylindrical guide rod 167 which extends vertically through the tubular shank of the gripper pipe and the nozzle of the intermediate conduit and is secured to a collar 168 on the underside of the gripper pipe by means of a set screw 169, while the upper end of this guide rod passes through the top of the intermediate pipe and is received between two concave guide rollers 170 mounted within a casing 171 on top of the intermediate suction pipe, and the lower end of this guide rod is received between two concave guide rollers 172 mounted in an enclosing casing 173 arranged on the lower part or base of the machine, as best shown in Figure 12. In order to prevent leakage of air through the opening 174 in the top of the intermediate air pipe through which this guide rod passes, a packing ring or washer 175 is placed around this guide rod and in engagement with the top of this intermediate pipe, as shown in Figure 12, whereby the inward suction of the air through this pipe tends constantly to draw this packing ring against the intermediate pipe and the adjacent part of this guide rod so as to form a practically air tight joint therebetween, while at the same time permitting slight lateral movement of this guide rod in the opening to prevent binding of the same. In order to avoid undue frictional contact between the tubular shank and the tubular nozzle, the same are separated from each other by an annular space or gap so that the tubular shank is free to move laterally to a limited extent under the weight of the pneumatic gripper while the machine is in operation and still avoid frictional engagement of this shank with the nozzle. Any appreciable amount of air is, however, prevented from leaking upwardly through the joint between the shank and the nozzle, by means of a packing ring or washer 176 engaging with the lower end of the nozzle and the adjacent part of the periphery of the tubular shank, as shown in Figure 12, this packing ring being held in place by the constant inward pressure exerted against the same through the medium of the air suction produced within this conduit by the exhaust fan. When the machine is not in operation, the absence of any suction within the pneumatic gripper would tend to release the packing ring or washer 176 and permit the same to drop out of place, but such dropping to an undue extent is prevented by means of a retaining ring 177 which is secured to the lower end of the nozzle so as to underlap the packing ring, as shown in Figure 12, and thereby limit the extent of the downward movement of this packing ring when the suction through the gripper mechanism ceases upon arresting the operation of the machine.

The pneumatic gripper head and the suction pipe directly connected therewith is yieldingly held in its elevated position by means of a spring 178 which is connected at its lower end by means of a rod 179 with the adjacent lower part or base of the machine while the upper end of this spring is connected with an adjusting rod 180 which latter is in turn connected at its upper end with a rear arm 181 of the operating lever 145 and extending rearwardly from the pivot 146 thereof, as shown in Figures 1, 2, 12, 40 to 44. The tension of the spring 178 is sufficiently strong to cause the rear arm 181 of this lever to be yieldingly held in a depressed position so that the front arm 147 of the same holds the pneumatic gripper pipe and head yieldingly in an elevated position, as shown in Figures 1, 3 and 12.

The horizontally swinging movement of the pneumatic gripper from the transfer position over the heading feed table to the barrel assembling position is effected manually by the operator taking hold of the handle 182 on top of the pneumatic gripper and manipulating the same for this purpose, but the horizontal return movement of this gripper from the barrel assembling position to the heading feeder, as well as the vertical movement of the gripper toward and from the barrel which is to be headed and also the vertical downward motion of the gripper head, while over the heading feeder for engaging a barrel thereon is effected automatically, the means for this purpose being preferably constructed as follows:

The numeral 183 represents a gripper depressing cam which is mounted on the front part of the shelf and provided with a cam surface which faces toward the pneumatic gripper and has a horizontal downwardly facing portion 184 next to this gripper, a vertical portion 185 arranged over the barrel assembling position and an intermediate curved portion 186 connecting the horizontal and vertical portions, as best shown in Figures 1, 10 and 11. The rear part of the gripper pipe is provided with an anti-friction roller 187 which is mounted thereon by means of a clamp 188, as shown or by any other suitable means, which roller is adapted to engage with the cam arm for the purpose of producing a vertical motion of the pneumatic gripper toward and from the barrel body which is at the assembling position of the machine. While the pneumatic gripper mechanism is arranged with its gripper head in an elevated position over the barrel head receiving position, the roller 187 of the same bears against the upper horizontal portion 184 of the gripper depressing cam, as shown in Figure 1 and upon swinging this gripper toward the left or from a head receiving position to the barrel assembling position, this roller runs successively along the horizontal face 184, curved face 186 and vertical face 185 of the gripper depressing cam so that upon horizontally moving the gripper from the heading feeder to the barrel assembling position, the gripper will also be moved downwardly while at the barrel assembling position, and thus carry the barrel head which is held by the pneumatic gripper into the upper end of the barrel body intended to receive the same. After the barrel head has been secured to the body of the barrel by the means which will be hereinafter described, the operator releases the forward and downward pressure upon the gripper, whereby the latter is released and the same is moved upwardly by the tension of the spring 178 which is transmitted to this gripper through the medium of the lifting lever 145 and during this upward movement, the roller 187 of the gripper pipe engages successively with the vertical, curved and horizontal surfaces of the gripper depressing cam 183, whereby the gripper is moved horizontally from the barrel assembling position to the heading receiving position over the heading feeder In order to prevent the machine from being jarred and also to prevent undue noise and wear on the parts, the rearward movement of the gripper from the barrel assembling position to the heading feeder is cushioned, the means preferably employed for this purpose consisting of a spring 330 made of a plurality of spring leaves which are secured to each other and form a cushion arm which has its fixed inner end secured to a bracket 189 on the right hand part of the shelf while the free end of this spring arm is arranged in the path of the pneumatic gripper head so that the latter upon swinging backwardly to its head receiving position will strike this cushion arm, whereby the latter not only serves as a stop to limit the movement of the pneumatic gripper in this direction, but also yields under the impact of the pneumatic gripper and avoids undue jarring which otherwise would result.

*Body compressor mechanism.*

The body of the barrel, which is adapted to receive a head within its upper end from the pneumatic gripper while these parts are at the barrel assembling position, is placed by the operator upon the lower front part of the base of the main frame, so that the lower end of the barrel is supported on this base and the barrel as a whole is axially in line with the head as the latter is lowered by the pneumatic gripper. The downward movement of the pneumatic gripper relative to the base of the machine is so adjusted that when the head is moved into its lowermost position by this gripper, the peripheral edge of this head will be arranged horizontally in line with the internal crozes or grooves 52 at the upper ends of the barrel staves, as shown in Figure 10. While the barrel and head are in this relative position, the upper ends of the staves are contracted or pressed together so that the grooves or crozes of these staves engage with the edge of the barrel head and cause these parts to be interlocked, this operation being performed by a compressor mechanism which is preferably constructed as follows, and is best shown in Figures 1 to 10, 34, 35 and 45:

The numerals 190, 190 represent two horizontally swinging compressor arms which are pivotally mounted at their corresponding rear ends on a vertical pivot post, pin or stud 191 so that the free front parts thereof are capable of swinging horizontally toward and from each other. On their opposing inner sides, these compressor arms are provided with a plurality of compressor jaws 192 which preferably have curved faces adapted to engage with opposite sides of the barrel body adjacent to the upper ends thereof and contract or draw the same together so that the crozes thereof engage with the edge of the barrel head. The movement of these two compressor arms together with the jaws mounted thereon is preferably effected by means of an upright compressor rock shaft 193 arranged in rear of the compressor arm pivot, and two toggle links 194, 195 which respectively connect two rearwardly projecting lugs 196 on the compressor arms with two forwardly projecting lugs 197 arranged on a hub 198 which is secured to the compressor shaft, as shown in Figure 34. The length of these links and the relative position of the pivotal connections of the same between the compressor hub 198 and lugs of the compressor arms is such that upon turning the compressor shaft backwardly into its rearmost position the toggle links will cause the compressor arms to be spread apart their fullest extent so as to permit free introduction of the body of the barrel into the space between these arms and the removal of the same at the front side of the machine, as shown in Figures 1 and 2.

Upon turning the compressor shaft to its foremost position in the opposite direction, the toggle links will be shifted so that the compressor arms engage with opposite sides of the barrel body and interlock the staves with the barrel head as previously described. The forward throw of this compressor shaft is preferably so timed that it is arrested when the pivotal connection between each toggle link and the lugs of the compressor hub and the respective compressor arm are on a dead center or line or slightly forward of this dead center so that at this time, the compressor arms are in their fully closed position, or substantially so, and the resistance offered by the body of the barrel which is being compressed will operate to hold the toggle links in their locked, closed or straightened position. The compressor shaft is moved forwardly in this manner by means of power which is derived from a constantly rotating driving wheel 199 which is mounted on the lower part of the compressor shaft and which is coupled with the compressor shaft and uncoupled therefrom by a clutch which preferably consists of a rim or flange 200 arranged on this driving wheel and provided with an internal conical clutch face 201 and a longitudinally movable driven clutch disk 202 connected by means of a spline 203 with the compressor shaft 193 so as to be compelled to turn therewith but free to slide thereon and provided with a conical clutch face 204 which is adapted to engage with the correspondingly shaped clutch face 201 of said driving wheel upon lowering the driven clutch disk. Upon raising this driven clutch disk, the conical face of the same will be disengaged from that of the driving clutch disk or wheel 199 and thereby disconnect the compressor shaft from this driving wheel. The lowering of the driven clutch disk is effected by means of a clutch controlling lever 205 which is pivoted by means of a horizontal pin 206 on a hanger 207 depending from the main frame so that this lever swings vertically, the inner part 208 of this clutch lever being bifurcated and provided with shifting pins 209 which engage with diametrically opposite sides of a groove 210 in the hub of the driven clutch disk, while the outer arm 211 of this clutch lever is adapted to be raised manually for depressing the driven clutch disk and causing the compressor shaft to be coupled with the driving wheel 199. The raising of the outer arm 211 of the clutch lever is effected by means of a foot lever 212 which is pivoted on the base of the main frame by means of a horizontal pin 213 so that the same swings in the vertical plane and is provided on its front part with a treadle 214 upon which the operator presses his foot while the rear arm 215 of this lever has pivoted thereto the lower end of a transfer or shifting bar 216 which is adapted to engage its upper end with the underside of the outer arm 211 of the clutch lever, as best shown in Figures 3 and 7. Upon depressing the front arm of this foot lever, the shifting bar 216 is raised and lifts the outer arm 211 of the clutch lever, thereby lowering the driven clutch disk 202 into engagement with the driving clutch wheel 199 and thereby causing the compressor shaft to be coupled with this driving wheel and produce a forward turning movement of the compressor shaft for straightening the toggle links and moving the two compressor arms toward opposite sides of the barrel body for compressing the staves around the barrel head in the manner previously described. When the clutch lever is free the same is moved in the opposite direction for opening the compressor clutch by the preponderating weight of the outer arm 211 of this lever together with the pulling effect of a spring 217 connecting the outer arm of this lever with the main frame, and also by the resilience of a spring 218 interposed between the clutch wheel and disk, as shown in Figure 39. The opening movement of the clutch lever is limited by engagement of its outer arm with a stop 219 arranged underneath the same on the frame.

Means are provided for definitely arresting the forward rotary motion of the compressor shaft when the same has turned sufficiently to cause the toggle links to assume a straightened or dead center position or slightly beyond this position which means also form part of the mechanism whereby the compressor clutch mechanism may be subsequently disengaged either manually or automatically depending upon circumstances. This mechanism in the preferred form as shown in the drawings is constructed as follows:

In front of the clutch lever is arranged a compressor releasing lever 220 which is pivoted on the main frame by means of a horizontal pin 221 and provided with an outer horizontal arm 222 which is arranged substantially parallel with and adjacent to the outer arm of the clutch lever and it also has an upright inner arm 223 projecting upwardly as shown in Figures 7 and 45. Arranged in an upright position adjacent to the inner side of this upright arm, as shown in Figure 45, is an intermediate throw-off lever 224 which is pivotally and yieldingly mounted at its upper end on the main frame while the inner side of its lower end is adapted to be engaged by a rear tappet 225 on the driven clutch disk 202 and the intermediate part of its outer side is adapted to be engaged by a front tappet 226 on the inner upright arm of the intermediate lever 220. The pivotal and yielding connection between this intermediate lever 224 and the main frame is preferably effected by providing the upper end of this lever with a notch 227 which receives a knife edge 228 on the main frame, and a spring 229 bearing at one end against the outer side of this intermediate lever adjacent to the knife edge, while its other end bears against a washer 230 arranged on a retaining bolt 231 which preferably passes through the upper part of the intermediate lever. The rear tappet 225 which engages with the lower part of the intermediate lever is preferably constructed in the form of a screw bolt which is adjustably mounted on a bracket 232 rising from the driven clutch disk 202, so that the position of this tappet can be adjusted horizontally for properly timing the engagement of these parts. The front tappet 226 is also preferably constructed in the form of a screw so that its inner operative end may be adjusted horizontally and the same is also made vertically adjustable on the inner arm 223 of the clutch lever so as to properly time the movement of these parts, this vertical adjustment being preferably effected by providing this arm with a vertical slot 331 through which the bolt 226 passes and applying two clamping nuts 332, 333 to this bolt so that they engage with opposite sides of this upright arm and hold the tappet bolt 226 in whatever position may be found necessary to produce the required operation of the machine.

As the driven clutch disk 202 completes its forward rotary movement which occurs at the time the toggle links assume a straightened position or slightly beyond the same, the clutch disk tappet 225 engages with the lower end of the intermediate lever 224 which latter at this time is rigid by reason of this intermediate lever engaging with the front tappet 226 and the outer arm 222 of the compressor releasing lever resting on the stop 219, as shown in Figure 45, thereby arresting the further turning movement of the compressor shaft in this direction. If now the outer arm 222 of the compressor releasing lever is raised, the tappet 226 on the upright inner arm of the same will cause the intermediate throw-off lever 224 to move the driven clutch disk 202 backwardly a sufficient extent to cause the compressor shaft to also move in the same direction the required distance for slightly folding or moving the toggle links backwardly off the dead center. The instant this occurs completion of the opening movement of the compressor jaws and completion of the return movement of the compressor shaft will be automatically effected by a return spring 250 arranged horizontally in rear of the compressor arm pivot and connected at its opposite ends with lugs 251 projecting downwardly from the rear parts of the compressor arms, as best shown in Figures 1 and 3. In order to cushion the compressor arms at the end of the opening movement, two cushioning springs 252 are seated in pockets 253 on the inner ends of the compressor arms and provided with buffer rods 254 guided in these pockets and adapted to engage each other and compress these springs, as shown in Figures 2 and 34.

Means are provided whereby alternate downward movements of the treadle of the clutch lever under the pressure of the foot of the operator will cause the compressor clutch to be alternately closed and released to permit it to open so that one downward pressure of this treadle will cause the compressor arms to embrace the staves of the barrel body and the next downward pressure upon the treadle will cause these compressor arms to release their pressure upon the barrel and swing away therefrom.

In the preferred means for accomplishing this purpose, the shifting bar 216 is so mounted that during the first depression of the treadle the upper end of this bar will engage with the underside of the outer arm of the clutch lever 211, as shown by full lines in Figures 3 and 7, but after the next following downward movement of this shifting bar, the same will be swung forwardly so that its upper end is underneath the outer arm of the compressor releasing lever, as shown by dotted lines in Figure 7 whereby the second depression of the treadle will cause the outer arm of the compressor releasing lever to be raised and thus produce the initial backward rotation of the driven clutch disk 202 and a corresponding reverse motion of the compressor shaft, thereby throwing backwardly the toggle links from the dead center of the same and enable the opening spring 250 to function for fully opening and completing the disengagement of the compressor arms from the barrel body. In order to prevent this shifting bar from swinging too far back and forth between the under sides of the outer arms of the clutch controlling lever and the compressor releasing lever, these arms are provided on their opposite longitudinal edges with stop flanges 235, 236 which are engaged alternately by the shifting bar as the same is moved from one position to another, as indicated by full and dotted lines in Figure 7.

The shifting bar 216 is swung back and forth between the clutch controlling lever and the compressor releasing lever by means which preferably comprise a horizontally turning transfer lever which turns about an upright post 237 on the main frame and has an outer arm 238 which is provided with a loop 239 receiving the intermediate part of the shifting bar while the inner arm of this transfer lever is engaged by a cam 240 secured to the compressor shaft, so as to turn therewith. Instead of making this transfer lever in one rigid piece, the same is made up of sections which are yieldably connected so as to permit the cam 240 to strain this lever and shift that part thereof which is in engagement therewith, while the other part thereof which is in engagement with the shifting bar 216 may lag behind when its movement is restrained. In the preferred form of the transfer lever for accomplishing this purpose, its inner arm is constructed of sections which are yieldably connected, the same comprising an inner section 241 which is rigidly connected with or formed integrally with the outer arm 238 of this lever, and an outer section 242 which engages at its outer end with the cam 240 and is yieldingly connected with the inner section 241 by means of a knife or fulcrum edge 243 on the inner section 241 engaging with the correspondingly shaped notch 244 in the outer section 242, a tension bolt 245 passing through corresponding openings in the arm sections 241, 242 and bearing with its head 246 against the outer side of one of these sections, a spring 247 surrounding this tension bolt and bearing with its inner end against one of the lever sections and also against the nut of this bolt, as shown in Figure 6. While the compressor arms are open and the shifting bar 216 is underneath the clutch controlling lever the two sections of the inner arm of the transfer lever are flatwise in engagement with each other, as shown in Figure 4. When, however, the shifting bar 216 has been raised and the cam 240 turns forwardly with the compressor shaft for closing the compressor arm, this cam will only deflect the outer section 242 of the transfer lever because the outer arm 238 is restrained at this time, as shown in Figure 5. The instant, however, the upward pressure of the bar 216 against the clutch lever is released the spring 247 which is now under tension will immediately throw the shifting bar 216 forwardly from underneath the clutch lever against the side of the compressor releasing lever and when the shifting bar has been lowered sufficiently to clear the compressor releasing lever, the resilience of the spring 247 will move the shifting bar underneath the compressor releasing lever, as shown by dotted lines in Figure 7. The operator by now again depressing the treadle will cause the shifting bar 216 to raise the outer arm of the compressor releasing lever so that the inner arm of this lever by engaging with the intermediate throw-off lever causes the driven clutch disk 202 to be turned backwardly sufficiently to effect the initial part of the opening movement of the toggle links and enable the complete rearward movement of these links and the full opening of the compressor jaws and arms to be effected by means of a return spring 250. As the compressor shaft is turned backwardly a full stroke by means of the return spring 250, the transfer cam will throw the transfer lever in the opposite direction and cause the shifting bar 216 to be again moved rearwardly from underneath the compressor releasing lever to a position underneath the clutch controlling lever leaving the parts ready for again causing the compressor clutch to be coupled closing the compressor arms around the barrel whenever the operator again depresses the treadle for effecting another cycle of operations of the machine.

*End hoop driving mechanism.*

After the upper ends of the staves of the barrel body have been compressed around the head which has been supported therein by means of the pneumatic gripper, the suction of the latter is cut off by any suitable means so that the hold of this gripper on the barrel head is released and permits the gripper to be returned to its initial or head receiving position over the head feeding mechanism and also to clear the space above the barrel and permit of applying an end hoop 53 around the upper ends of the barrel staves for confining the same against spreading before the compressor mechanism is disengaged therefrom. The end hoop 53 is taken from any suitable source of supply and applied by the operator downwardly loosely around the upper ends of the staves of the barrel body but the complete downward movement of the same around the staves for firmly holding the latter in place is effected by a hoop driving mechanism which is power operated and which in the improved form shown in the drawings is constructed as follows:

The numeral 255 represents a driving head or hammer which preferably has the form of a disk and adapted to strike with its under flat side against the upper edge of the uppermost hoop after the same has been loosely applied to the staves and drive this hoop downwardly so that its upper edge is flush or substantially so with the upper ends of the staves. In its vertical movement toward and from the upper end of the barrel, this driving or hammer head is supported and guided by means of a vertically swinging driving arm 256 which is pivotally connected at its front end by a horizontal pivot 257 with a bracket 258 projecting upwardly from the center of the driving head while its rear end is pivotally connected by means of a horizontal pivot 259 with a bracket 260 projecting upwardly from the adjacent part of the shelf 55, as shown for instance in Figures 1, 2 and 35. The hammer head is constantly maintained in a position in which its underside is horizontal by means of an alining rod or link 261 which is arranged parallel with the driving arm 256 and is pivotally connected at its front and rear ends by means of horizontal pivots 262, 263 with the upper parts of the brackets 258, 260, on the hammer head and the shelf. The length of the driving arm and the alining rod are the same so that these members in effect produce a parallelogram movement and always ensure a uniform engagement of the under surface of the hammer head with the upper edge of the end hoop which is being driven so that the latter will be applied evenly to the upper end of the barrel body.

This hammer or driving head is yieldingly held in its elevated position by means of a spring 264 arranged at the rear of the machine and connected at its lower end with the base thereof while its upper end is connected with a rearwardly projecting lifting arm 265 formed on the driving arm in rear of the axis of the latter, as best shown in Figure 35. Power operated means are employed for causing the driving head or hammer to descend and deliver a quick and powerful blow of the driving head against the end hoop after the same has been placed upon the barrel by the attendant, which hammer actuating means are under the control of the attendant and in their preferred form are constructed as follows:

The numeral 266 represents a constantly rotating hammer operating friction pulley which is mounted on the adjacent portion of a driving shaft 267, the latter being preferably arranged horizontally and lengthwise in the rear part of the machine and journaled in suitable bearings 268 on the base thereof. Power is applied to this driving shaft by means of a belt passing around a driving pulley 269 on this shaft and receiving its power from any suitable source. Arranged in front of the hammer operating pulley is a vertically swinging rock arm 270 which turns about a horizontal pin 271 and is provided at its rear end with a friction segment 272 which is curved concentrically with the axis of the pivot pin 271 and is adapted to be engaged with or disengaged from the pulley 266. Upon engaging the segment with this pulley the latter by frictional engagement with this segment will cause it to swing downwardly while upon disengaging the segment from this pulley it will be free to rise independently of this pulley.

The downward motion of this segment and the rock arm which carries the same is transmitted to the driving or hammer arm 256 by means of an upright shifting or connecting rod 273 which is connected at its upper end with the hammer arm between the front and rear ends thereof, while its lower part is connected with the segment arm 270, this last mentioned connection being preferably effected by passing the lower end of this connecting rod through an opening 274 in a flange 275 of the segment arm and applying screw nuts 276, 277 to that rod so that the same engage with the upper and lower sides of this flange and permit of adjusting the relative position of this segment arm and the hammer arm for obtaining the proper throw of the several parts during the operation of the machine. In order to cushion the downward motion of this connecting rod and the hammer arm and hammer head connected therewith, particularly if the same should be operated when no hoop is present over a barrel body to be driven thereon, means are provided which preferably consist of a coiled spring 278 surrounding the connecting rod 273 and bearing with its lower end upon a cross bar 279 while its upper end is adapted to be engaged by means of a shoulder 280 on the adjacent part of this connecting rod, this shoulder being preferably constructed in the form of a screw nut which engages with a screw thread on the adjacent part of the connecting rod, as shown in Figure 1, so as to permit this shoulder or collar to be raised and lowered and thereby adjust the cushioning effect of the spring in accordance with the height of the barrel which is being operated upon, the width of the hoop which is being driven on the upper end of the barrel and other conditions. The bar 279 is provided with an opening through which the connecting rod 273 passes and the same is supported from the base by posts 281, as shown in Figure 35. The movement of the hammer operating segment toward and from the friction wheel or pulley 266 for operating the hammer or releasing the same is effected by means which comprise an upright shifting link 283, the lower end of which is pivoted on the adjacent part of the base by a horizontal pin 282 while its upper end carries the pivot pin 271 about which the arm of the friction segment turns, as best shown in Figures 36, 37 and 38.

When the hammer is idle the shifting link 283 is swung with its upper end away from the friction pulley 266 so that the friction segment is disengaged from the same and thereby permits the hammer head to be held by the spring 264 in its elevated position, as shown in Figures 1 and 3 and the friction segment to be also held in its elevated position, as shown in Figure 36. Upon swinging the shifting link 283 with its upper end toward the friction pulley, the segment will be pressed with its periphery against the periphery of this pulley which is constantly rotating so that the friction segment will move downwardly into its lowermost position, as shown in Figure 38, and thereby depress the hammer head for delivering a blow against the end hoop of the barrel, as shown in Figure 35. Upon now moving the upper end of the shifting link 283 away from the friction pulley, the segment will also be moved in the same direction, thereby releasing this segment from frictional contact with the friction pulley and permitting the segment to rise together with the hammer arm and the hammer head is elevated or carried away from the upper end of the barrel by operation of the spring 264.

The shifting of the link 283 toward and from the friction pulley for engaging and disengaging the latter with the friction segment is effected by means which comprise a rocking shifting arm 284 mounted with its front part on this link and having the upper side of its rear part engaged by means of a vertically swinging intermediate rock lever 285 which latter is pivoted at its rear end by means of a horizontal pin 286 on an adjacent part of the machine. Extending crosswise over the base of the machine in rear of the barrel receiving position is a horizontal trip shaft 287 which is journaled in suitable bearings on this part of the main frame and provided at one end, for instance, the right hand end with an operating handle or lever 288 while its left hand end is provided with a forwardly projecting trip arm 289 which terminates at its front end with a laterally projecting trip pin or lug 290 engaging with the upper side of the intermediate trip lever 285, as best shown in Figures 4, 36, 37 and 38. Whenever it is desired to operate the end hoop driving mechanism, the attendant pulls the hand lever 288 downwardly from the position shown by full lines in Figure 3 to the position shown by dotted lines in the same figure, thereby causing the trip shaft 287 to be turned in the proper direction for lowering the trip pin 290 on its trip arm 289 which motion is received by the intermediate trip lever 285 and transmitted to the rock arm 284 which is mounted on the shifting link 283 whereby the latter is carried inwardly or toward the friction pulley and causes the segment to be carried into engagement with this pulley. As a result of this operation the segment by frictional engagement with the friction wheel will be depressed and the hammer arm lowered so as to deliver a blow of its driving head against the end hoop of the barrel in the manner previously described. After this blow has been delivered, the operator releases the downward pressure against the handle 288 whereby the latter is permitted to rise and the trip shaft to turn in the opposite direction so as to release the downward pressure against the intermediate rock lever 285. This reverse movement of these parts is effected by a spring 291 which is interposed between the underside of the rock arm 284 and the adjacent part of the base, as best shown in Figure 37, thereby operating the shifting link 283 so that it moves with its upper end away from the friction pulley and thereby disengages the friction segment therefrom. The return movement of the trip shaft 287 is preferably arrested by providing this shaft with a rearwardly projecting stop arm 292 having a stop screw 293 on its rear part which is adapted to engage with the upper side of the base, as shown in Figure 36. This screw upon being turned permits of adjusting the position at which the return movement of this trip shaft and the parts associated therewith is arrested.

In assembling the machine or taking up wear it is necessary to adjust the friction segment so that the same is sufficiently close to the friction wheel to ensure a prompt engagement of these parts when desired. For this purpose means are provided for adjustably connecting the shifting link 283 and the operating arm 284 so that the same may be adjusted circumferentially relatively to each other, which means in their preferred form consist of a horizontal pivot 294 which connects the front part of the operating arm 284 with the shifting link 283 and two adjusting screws 295, 296 which are arranged in threaded openings formed in lugs 297, 298 projecting from the front and rear sides of the upper part of the shifting link, and the lower ends of these screws bearing against the upper side of the operating arm in front and in rear, respectively of the pivot pin 294 which connects this arm with the shifting link, as best shown in Figures 4, 36, 37 and 38. Upon loosening the front adjusting screw 295 and tightening the companion rear screw 296, the upper or free end of the shifting link 283 will be swung inwardly or rearwardly toward the friction pulley 266 so that the friction segment will be arranged closer to this pulley and thereby ensure a prompt engagement of these members upon depressing the hand lever 288, while upon slackening the rear adjusting screw 296 and tightening the front screw 295, the upper end of the shifting link will be carried outwardly or away from the friction pulley together with the segment and thus increase the gap between the friction pulley and the friction segment. This action of the shifting link is due to the fact that the arm 284 at this time is assumed to be stationary and held practically immovable against the base through the medium of the intermediate shifting mechanism and the parts associated therewith.

After the operation of driving an end hoop on the barrel has been completed on one end thereof in the manner described, the barrel is reversed and a similar series of operations are performed for inserting a head in the opposite end of the barrel and securing the same therein by contracting the barrel staves around the same and retaining the staves in this position by driving a barrel hoop upon the last mentioned ends of the staves, and thereby completing the barrel so far as this particular machine is concerned.

In the preferred organization of this machine, means are provided whereby the releasing of the compressor mechanism from the barrel body is effected automatically upon the completion of the blow of the driving mechanism against the end hoop on the barrel and to accomplish this, a releasing lever 299 is arranged transversely in the rear part of the machine and pivoted between its arms on an upwardly projecting bracket 300 mounted on the base of the main frame so that this lever is capable of swinging vertically, one arm of this lever being arranged underneath the path of the segment arm 270 while the other arm thereof is connected by means of a rod or link 301 with the outer arm of the compressor releasing lever, as shown in Figure 45. It follows from this construction that when the segment arm 270 reaches its lowermost position the same will engage with the arm of the releasing lever 299 immediately below the same and depress it, as indicated by dotted lines in Figure 45, and thereby raise the other arm of this lever, whereby the compressor releasing lever 220, will be turned in the direction for effecting the initial part of the opening or folding action of the toggle mechanism, so that the completion of this opening movement may be effected by means of the spring 250 and the compressor arms 190 moved away from the opposite sides of the barrel body. It will thus be noted that the compressor mechanism can be opened or released from the barrel by depressing the treadle a second time after once depressing the same to cause a closing of the compressor around the barrel, and if such manual release is not employed, this result is accomplished automatically after the end hoop has been driven on the barrel.

It is desirable to relieve the operator of the necessity of depressing the pneumatic gripper manually while the same is arranged above the head delivery position of the heading feed mechanism and for this purpose means are provided for accomplishing this purpose automatically, which means in their preferred organization are constructed as follows:

The numeral 302 represents a vertically movable shifting pin guided on the main frame and adapted to engage its upper end with an extension 303 on the rear arm of the gripper elevating lever 145. The lower end of this shifting pin is engaged by the rear arm 304 of a depressing lever 305 which is pivotally mounted upon the adjacent part of the elevated shelf by means of a vertical pin 306 journaled on the shelf and a horizontal pin 307 passing through the vertical pin 306 and the lever 305 so that this latter is capable of both a vertically and a horizontally oscillating movement. The front arm 308 of this gripper depressing lever is provided with a roller 309 which is adapted to be engaged by a cam 310 on the adjacent part of the compressor shaft 193 which cam is provided with a cam shaped peripheral surface 311 and an inclined undersurface 312, as shown in Figures 40 to 44. When the machine is idle preparatory to beginning the compressor operation, the gripper lifting cam 310 on the compressor shaft 193 is arranged in rear of the roller on the gripper compressor lever 305, as shown in Figure 40, in which position this roller is yieldingly held by turning the gripper depressor lever in the proper direction through the medium of a spring 313 which surrounds the vertical pin 306 and engages its opposite ends with the main frame and an arm of this gripper depressor lever. During the forward movement of the compressor shaft, the peripheral cam surface of its gripper operating cam 310 engages with the roller 309 of the gripper depressing lever and deflects the same from the position shown by full lines in Figure 40 to the position shown by dotted lines in Figure 41. When the abrupt rear face 314 of this cam clears this roller 309 it trips over the same and permits the spring 313 to turn the depressing lever 305 from the position shown by dotted lines in Figure 41 to the position shown by full lines in the same figure, so that its roller stands at the elevated end of the inclined surface 312. During the subsequent backward or reverse movement of the compressor shaft the inclined underside 312 of this cam engages with the roller 309 and causes the front arm of the gripper depressor lever to be lowered and the rear arm thereof raised, as shown in Figures 42 and 44, thereby causing an upward movement of the shifting pin 302 and the rear arm 303 of the gripper elevating lever 145 so that the front arm of the last mentioned lever is depressed. This permits the pneumatic gripper to descend by gravity and engage its mouth with the upper side of the barrel head which at this time is present at the delivery end of the head feeding mechanism and attaches itself thereto by reason of the pneumatic suction which is created therein at this time. After the compressor shaft completes its backward rotary movement the roller 309 of the gripper depressor lever clears the front end of this cam 310 and is permitted to swing upwardly together with the respective arm of the gripper depressor lever, whereby the gripper elevating lever is permitted to rise under the downward pulling effect of the spring 178 on the rear arm thereof, whereby the pneumatic gripper is raised and lifts the barrel head attached thereto from the delivery end of the heading feed mechanism.

Various means may be provided for transmitting motion from the driving shaft 267 to the driving wheel 199 but this is preferably accomplished by means of a worm 315 on the driving shaft engaging with a worm wheel or rim 316 on the driving wheel 199, as shown in Figures 4 and 34. The clutch or driving disk 113 may also be driven from the driving shaft 267 by various means but in the preferred construction, this last mentioned driving connection is preferably so made that the same will yield if an undue resistance is offered to the working of the heading feed mechanism such as would occur if some of the heading should become caught between relatively movable parts and thereby prevent breakage or injury to the mechanism. For this purpose the driving connection between the clutch disk 113 and the driving shaft 267 is preferably effected by means of a worm wheel 317 having its hub 318 mounted on an upright shank 319 of the clutch disk 113 and frictionally clamped thereon by engaging the lower side of the hub of this worm wheel with the upper side of the clutch disk 113 and engaging the upper side of the hub of this worm wheel frictionally with the underside of a presser disk 320, which latter is yieldingly held against this side of the worm wheel hub by means of a spring 321 surrounding the shank 319 and interposed between the presser disk 320 and a screw nut 322 arranged on the shank 319, as shown in Figure 33. The teeth of this worm wheel 317 mesh with a worm 323 on the adjacent part of the driving shaft 267, as shown in Figure 4. Normally the frictional connection between the worm wheel 317 and the clutch disk 113 is sufficiently firm so that the rotary movement which this worm wheel receives from this driving shaft is transmitted to the clutch disk 113 and its teeth or pins 122 rotate continuously. If, however, anything obstructs the oscillating motion of the feed table of the heading feed mechanism or interference occurs with the free movement of other parts of this mechanism or those associated therewith which would offer a resistance greater than that for which the frictional coupling between the worm wheel and the clutch disk is set then the worm wheel 317 will simply slip around frictionally relatively to the clutch disk without operating any of the parts associated therewith and thereby prevent injury to the same.

The exhaust fan is also operated from this driving shaft 267 by means of a belt 324 passing around a driving wheel 325 on the driving shaft and around a driven pulley 326 on the shaft of the exhaust fan while its intermediate part passes around a guide pulley 327 on the main frame.

Briefly described the operation of this machine through one cycle is as follows:

Assuming that a supply of barrel heads has been placed in the magazine and that a barrel body has been placed in the assembling position, and also assuming that a barrel head is fastened to the pneumatic gripper, the operator first moves this gripper together with the barrel head from the heading feeder mechanism to the place over the barrel body at which last mentioned place the gripper is automatically depressed by means of a cam 183 so as to carry the barrel head into the open upper end of the barrel body. While the parts are in this position the attendant depresses the treadle which causes the compressor clutch to couple the toggle mechanism of the compressor with the driving disk wheel 202 so that the toggle links are straightened and the compressor arms engaged with the staves of the barrel body for pressing the latter around the edge of the barrel head. If, for any reason, it is desired to again release the compressor arms from the barrel body before applying the end hoop thereto, as for instance, when setting up the machine and making tests on a particular size of barrel which is to be headed, the operator can release the compressor arms from the barrel body by stepping on the treadle a second time thereby causing the compressor mechanism to be released and opened or disengaged from the barrel body. If, however, such release of the compressor mechanism from the barrel body is not desired, the operator, after the compressing mechanism engages with the barrel body, will operate the valve mechanism of the pneumatic valve gripper so as to cut off the air suction and thereby permit the pneumatic gripper to be detached from the barrel head and returned to the heading feed mechanism leaving the barrel head within the upper end of the compressed barrel body. A previously prepared barrel hoop is now placed over the upper end of the barrel staves by the attendant and then the latter depresses the handle 288 whereby the end hoop driver or hammer mechanism is set in operation and a blow is delivered upon the end hoop which drives the same downwardly over the staves and fastens the head therein. During the last part of the downward motion of the end hoop driver, the compressor release lever 220 is turned in the direction for effecting the initial part of the opening movement of the toggle links so as to permit the completion of the opening movement of the compressor arms to be effected by this spring 250 thereby releasing the finished barrel and permitting the same to be replaced by another barrel body preparatory to beginning the next cycle of operations. During the last part of the compressor opening operation, the cam 310 operates to depress the pneumatic gripper so that the same attaches itself to the next following barrel head from the heading feed mechanism and then lifts the same preparatory to being moved manually by the attendant into a position over the barrel body at the assembling position, ready to repeat the operations as before described.

I claim as my invention:

1. A barrel making machine comprising a main frame, an upright magazine adapted to receive a pile of barrel heads, means for feeding the heads successively from the bottom of said pile, and supporting means for supporting said magazine comprising an arm pivoted between its outer and inner ends on said frame and supporting the magazine on its outer end and adjusting screws arranged on the inner parts of said arm and engaging said frame.

2. A barrel making machine comprising a main frame, an upright magazine adapted to receive a pile of barrel heads, means for feeding the heads successively from the bottom of said pile and means for adjustably supporting the magazine comprising two studs projecting upwardly from the frame, an arm having two inwardly converging bars provided between their inner and outer ends with openings which receive said studs, a ring arranged at the outer ends of said bars and carrying said magazine, and adjusting screws arranged on said bars on opposite sides of said studs and bearing against said frame.

3. A barrel making machine comprising a main frame, an upright magazine adapted to receive a pile of barrel heads, means for feeding the heads successively from the bottom of said pile, means for adjustably supporting the magazine comprising two studs projecting upwardly from the frame, an arm having two inwardly converging bars provided between their inner and outer ends with openings which receive said studs, a ring arranged at the outer ends of said bars and carrying said magazine, and adjusting screws arranged on said bars on opposite sides of said studs and bearing against said frame, and thrust resisting means mounted on said frame and overhanging the inner part of said arm.

4. A barrel making machine comprising a main frame, an upright magazine adapted to receive a pile of barrel heads, means for feeding the heads successively from the bottom of said pile, means for adjustably supporting the magazine comprising two studs projecting upwardly from the frame, an arm having two inwardly converging bars provided between their inner and outer ends with openings which receive said studs, a ring arranged at the outer ends of said bars and carrying said magazine, and adjusting screws arranged on said bars on opposite sides of said studs and bearing against said frame, and thrust resisting means comprising a thrust arm engaging with the upper end of the inner adjusting screw on said arm, a vertical pivot pin on said frame about which said thrust arm is adapted to turn horizontally, and a clamping screw nut arranged on said pivot pin and engaging with the upper end of said inner adjusting screw.

5. A barrel making machine comprising a main frame, an upright magazine adapted to receive a pile of barrel heads, means for feeding the heads successively from the bottom of said pile and means for adjustably supporting said magazine on said frame comprising a pivot stud rising from said frame, an arm having an opening which receives said stud, and adjusting screws arranged on said arm on opposite sides of the pivot stud and engaging said frame.

6. A barrel making machine comprising a magazine adapted to contain a pile of barrel heads which are removable from the lower end thereof, a heading feed mechanism which removes the heads successively from the bottom of the pile in the magazine and moves them to a transfer place comprising a feed table movable forwardly and backwardly between the underside of said magazine and said transfer place and provided on its front part with a pocket adapted to register alternately with the underside of said magazine to receive the lowermost head therefrom and the underside of said gripper at the transfer place to deliver a head thereto and the rear part of said table being adapted to move across the lower end of said magazine and to close the same and hold back the remaining heads therein and a vertically movable drop plate arranged in said pocket and adapted to be elevated flush with the top of said table while the latter is moving rearwardly away from the magazine and until said pocket is in line therewith and thereafter lowered to permit a head to enter the pocket, and a carrying mechanism having a gripper which is adapted to attach itself to the upper side of the heads at the transfer place and move the heads away therefrom.

7. A barrel making machine comprising a magazine adapted to contain a pile of barrel heads which are removable from the lower end thereof, a heading feed mechanism which removes the heads successively from the bottom of the pile in the magazine and moves them to a transfer place comprising a feed table movable forwardly and backwardly between the underside of said magazine and said transfer place and provided on its front part with a pocket adapted to register alternately with the underside of said magazine to receive the lowermost head therefrom and the underside of said gripper at the transfer place to deliver a head thereto and the rear part of said table being adapted to move across the lower end of said magazine and to close the same and hold back the remaining heads therein, a vertically movable drop plate arranged in said pocket and adapted to be elevated flush with the top of said table while the latter is moving rearwardly away from the magazine and until said pocket is in line therewith and thereafter lowered to permit a head to enter the pocket and means for raising and lowering said drop plate, and a carrying mechanism having a gripper which is adapted to attach itself to the upper side of the heads at the transfer place and move the heads away therefrom.

8. A barrel making machine comprising a magazine adapted to contain a pile of barrel heads which are removable from the lower end thereof, a heading feed mechanism which removes the heads successively from the bottom of the pile in the magazine and moves them to a transfer place comprising a feed table movable forwardly and backwardly between the underside of said magazine and said transfer place and provided on its front part with a pocket adapted to register alternately with the underside of said magazine to receive the lowermost head therefrom and the underside of said gripper at the transfer place to deliver a head thereto and the rear part of said table being adapted to move across the lower end of said magazine and to close the same and hold back the remaining heads therein, a vertically movable drop plate arranged in said pocket and adapted to be elevated flush with the top of said table while the latter is moving rearwardly away from the magazine and until said pocket is in line therewith and thereafter lowered to permit a head to enter the pocket and means for raising and lowering said drop plate comprising an annular row of cams arranged on the feed table and each having a horizontal upper side, an inclined rear end and a vertical front end, an annular row of cams arranged on the drop plate and adapted to engage the cams of the table and each having a horizontal lower side, an inclined front end and a vertical rear end, and means for intermittently turning said drop plate, and a carrying mechanism having a gripper which is adapted to attach itself to the upper side of the heads at the transfer place and move the heads away therefrom.

9. A barrel making machine comprising a magazine adapted to contain a pile of barrel heads which are removable from the lower end thereof, a heading feed mechanism which removes the heads successively from the bottom of the pile in the magazine and moves them to a transfer place comprising a feed table movable forwardly and backwardly between the underside of said magazine and said transfer place and provided on its front part with a pocket adapted to register alternately with the underside of said magazine to receive the lowermost head therefrom and the underside of said gripper at the transfer place to deliver a head thereto and the rear part of said table being adapted to move across the lower end of said magazine and to close the same and hold back the remaining heads therein, a vertically movable drop plate arranged in said pocket and adapted to be elevated flush with the top of said table while the latter is moving rearwardly away from the magazine and until said pocket is in line therewith and thereafter lowered to permit a head to enter the pocket and means for raising and lowering said drop plate comprising an annular row of cams arranged on the feed table and each having a horizontal upper side, an inclined rear end and a vertical front end, an annular row of cams arranged on the drop plate and adapted to engage the cams of the table and each having a horizontal lower side, an inclined front end and a vertical rear end, and means for intermittently turning said drop plate comprising ratchet teeth arranged on the drop plate, and a ratchet arm mounted at one end on a fixed pivot and provided at its opposite end with a hook adapted to trip past said ratchet teeth during the forward movement of said table and to engage with one of said teeth and turn the drop plate one step during each backward movement of said table, and a carrying mechanism having a gripper which is adapted to attach itself to the upper side of the heads at the transfer place and move the heads away therefrom.

10. A barrel making machine comprising a magazine adapted to contain a pile of barrel heads which are removable from the lower end thereof, a heading feed mechanism which removes the heads successively from the bottom of the pile in the magazine and moves them to a transfer place, means for raising the pile of heads in the magazine to permit removal of the ties therefrom and a carrying mechanism having a gripper which is adapted to attach itself to the upper side of the heads at the transfer place and move the heads away therefrom.

11. A barrel making machine comprising a magazine adapted to contain a pile of barrel heads which are removable from the lower end thereof, a heading feed mechanism which removes the heads successively from the bottom of the pile in the magazine and moves them to a transfer place comprising a feed table movable forwardly and backwardly between the underside of said magazine and said transfer place and provided on its front part with a pocket adapted to register alternately with the underside of said magazine to receive the lowermost head therefrom and the underside of said gripper at the transfer place to deliver a head thereto and the rear part of said table being adapted to move across the lower end of said magazine and to close the same and hold back the remaining heads therein, means for raising the pile of heads in the magazine to permit removal of the ties therefrom and a carrying mechanism having a gripper which is adapted to attach itself to the upper side of the heads at the transfer place and move the heads away therefrom.

12. A barrel making machine comprising a magazine adapted to contain a pile of barrel heads which are removable from the lower end thereof, a heading feed mechanism which removes the heads successively from the bottom of the pile in the magazine and moves them to a transfer place comprising a feed table movable forwardly and backwardly between the underside of said magazine and said transfer place and provided on its front part with a pocket adapted to register alternately with the underside of said magazine to receive the lowermost head therefrom and the underside of said gripper at the transfer place to deliver a head thereto and the rear part of said table being adapted to move across the lower end of said magazine and to close the same and hold back the remaining heads therein, means for raising the pile of heads in the magazine to permit removal of the ties therefrom comprising a lifting lever pivoted on the underside of the rear part of said feed table and having a lifting pin adapted to project upwardly through said table and into engagement with the underside of said pile of heads in the magazine, and a carrying mechanism having a gripper which is adapted to attach itself to the upper side of the heads at the transfer place and move the heads away therefrom.

13. A barrel making machine comprising a magazine adapted to contain a pile of barrel heads which are removable from the lower end thereof, a heading feed mechanism which removes the heads successively from the bottom of the pile in the magazine and moves them to a transfer place comprising a feed table movable forwardly and backwardly between the underside of said magazine and said transfer place and provided on its front part with a pocket adapted to register alternately with the underside of said magazine to receive the lowermost head therefrom and the underside of said gripper at the transfer place to deliver a head thereto and the rear part of said table being adapted to move across the lower end of said magazine and to close the same and hold back the remaining heads therein, means for raising the pile of heads in the magazine to permit removal of the ties therefrom comprising a lifting lever pivoted on the underside of the rear part of said feed table and having a lifting pin adapted to project upwardly through said table and into engagement with the underside of said pile of heads in the magazine and provided at one end with a handle for lifting the same and at its other end with a weight for lowering the same, and a carrying mechanism having a gripper which is adapted to attach itself to the upper side of the heads at the transfer place and move the heads away therefrom.

14. A barrel making machine comprising a magazine adapted to contain a pile of barrel heads which are removable from the lower end thereof, a heading feed mechanism which removes the heads successively from the bottom of the pile in the magazine and moves them to a transfer place comprising a feed table movable forwardly and backwardly between the underside of said magazine and said transfer place and provided on its front part with a pocket adapted to register alternately with the underside of said magazine to receive the lowermost head therefrom and the underside of said gripper at the transfer place to deliver a head thereto and the rear part of said table being adapted to move across the lower end of said magazine and to close the same and hold back the remaining heads therein and a vertically movable drop plate arranged in said pocket and adapted to be elevated flush with the top of said table while the latter is moving rearwardly away from the magazine and until said pocket is in line therewith and thereafter lowered to permit a head to enter the pocket, means for centering the heads on said drop plate, and a carrying mechanism having a gripper which is adapted to attach itself to the upper side of the heads at the transfer place and move the heads away therefrom.

15. A barrel making machine comprising a magazine adapted to contain a pile of barrel heads which are removable from the lower end thereof, a heading feed mechanism which removes the heads successively from the bottom of the pile in the magazine and moves them to a transfer place comprising a feed table movable forwardly and backwardly between the underside of said magazine and said transfer place and provided on its front part with a pocket adapted to register alternately with the underside of said magazine to receive the lowermost head therefrom and the underside of said gripper at the transfer place to deliver a head thereto and the rear part of said table being adapted to move across the lower end of said magazine and to close the same and hold back the remaining heads therein, and a vertically movable drop plate arranged in said pocket and adapted to be elevated flush with the top of said table while the latter is moving rearwardly away from the magazine and until said pocket is in line therewith and thereafter lowered to permit a head to enter the pocket, means for centering the heads on said drop plate comprising two centering jaws mounted on said table around the socket pocket and plate and one movable toward and from the other, means for opening said jaws while the pocket is at the transfer place and closing the same at the magazine, and a carrying mechanism having a gripper which is adapted to attach itself to the upper side of the heads at the transfer place and move the heads away therefrom.

16. A barrel making machine comprising a magazine adapted to contain a pile of barrel heads which are removable from the lower end thereof, a heading feed mechanism which removes the heads successively from the bottom of the pile in the magazine and moves them to a transfer place comprising a feed table movable forwardly and backwardly between the underside of said magazine and said transfer place and provided on its front part with a pocket adapted to register alternately with the underside of said magazine to receive the lowermost head therefrom and the underside of said gripper at the transfer place to deliver a head thereto and the rear part of said table being adapted to move across the lower end of said magazine and to close the same and hold back the remaining heads therein and a vertically movable drop plate arranged in said pocket and adapted to be elevated flush with the top of said table while the latter is moving rearwardly away from the magazine and until said pocket is in line therewith and thereafter lowered to permit a head to enter the pocket, means for centering the heads on said drop plate comprising two centering jaws arranged around said pocket and plate and one of said jaws being fixed and the other movable toward and from the fixed jaw, means for opening the movable jaw at said transfer place consisting of a shifting arm on said movable jaw, and a movable dog adapted to be deflected by said arm during the last part of the forward movement of the feed table and to deflect said shifting arm for opening the movable jaw during the first part of the backward movement of the feed table and a carrying mechanism having a gripper which is adapted to attach itself to the upper side of the heads at the transfer place and move the heads away therefrom.

17. A barrel making machine comprising a magazine adapted to contain a pile of barrel heads which are removable from the lower end thereof, a heading feed mechanism which removes the heads successively from the bottom of the pile in the magazine and moves them to a transfer place comprising a feed table movable forwardly and backwardly between the underside of said magazine and said transfer place and provided on its front part with a pocket adapted to register alternately with the underside of said magazine to receive the lowermost head therefrom and the underside of said gripper at the transfer place to deliver a head thereto and the rear part of said table being adapted to move across the lower end of said magazine and to close the same and hold back the remaining heads therein and a vertically movable drop plate arranged in said pocket and adapted to be elevated flush with the top of said table while the latter is moving rearwardly away from the magazine and until said pocket is in line therewith and thereafter lowered to permit a head to enter the pocket, means for centering the heads on said drop plate comprising two centering jaws arranged around said pocket and plate and one of said jaws being fixed and the other movable toward and from the fixed jaw, means for opening the movable jaw at said transfer place consisting of a shifting arm on said movable jaw, and a movable dog adapted to be deflected by said arm during the last part of the forward movement of the feed table and to deflect said shifting arm for opening the movable jaw during the first part of the backward movement of the feed table, means for locking the movable jaw in its open position while the feed table is moving backwardly and unlocking the same upon reaching the magazine, and a carrying mechanism having a gripper which is adapted to attach itself to the upper side of the heads at the transfer place and move the heads away therefrom.

18. A barrel making machine comprising a magazine adapted to contain a pile of barrel heads which are removable from the lower end thereof, a heading feed mechanism which removes the heads successively from the bottom of the pile in the magazine and moves them to a transfer place comprising a feed table movable forwardly and backwardly between the underside of said magazine and said transfer place and provided on its front part with a pocket adapted to register alternately with the underside of said magazine to receive the lowermost head therefrom and the underside of said gripper at the transfer place to deliver a head thereto and the rear part of said table being adapted to move across the lower end of said magazine and to close the same and hold back the remaining heads therein, and a vertically movable drop plate arranged in said pocket and adapted to be elevated flush with the top of said table while the latter is moving rearwardly away from the magazine and until said pocket is in line therewith and thereafter lowered to permit a head to enter the pocket, means for centering the heads on said drop plate comprising two centering jaws arranged around said pocket and plate and one of said jaws being fixed and the other movable toward and from the fixed jaw, means for opening the movable jaw at said transfer place consisting of a shifting arm on said movable jaw, and a movable dog adapted to be deflected by said arm during the last part of the forward movement of the feed table and to deflect said shifting arm for opening the movable jaw during the first part of the backward movement of the feed table, means for locking the movable jaw in its open position while the feed table is moving backwardly and unlocking the same upon reaching the magazine comprising a catch mounted on said feed table and automatically engaging said movable jaw to hold it open and to be disengaged from said jaw by the descent of said drop plate, and a carrying mechanism having a gripper which is adapted to attach itself to the upper side of the heads at the transfer place and move the heads away therefrom.

19. A barrel making machine comprising a magazine adapted to contain a pile of barrel heads which are removable from the lower end thereof, a heading feed mechanism which removes the heads successively from the bottom of the pile in the magazine and moves them to a transfer place comprising a feed table movable forwardly and backwardly between the underside of said magazine and said transfer place and provided on its front part with a pocket adapted to register alternately with the underside of said magazine to receive the lowermost head therefrom and the underside of said gripper at the transfer place to deliver a head thereto and the rear part of said table being adapted to move across the lower end of said magazine and to close the same and hold back the remaining heads therein, and a vertically movable drop plate arranged in said pocket and adapted to be elevated flush with the top of said table while the latter is moving rearwardly away from the magazine and until said pocket is in line therewith and thereafter lowered to permit a head to enter the pocket, means for centering the heads on said drop plate comprising two centering jaws arranged around said pocket and plate and one of said jaws being fixed and the other movable toward and from the fixed jaw, means for opening the movable jaw at said transfer place consisting of a shifting arm on said movable jaw, and a movable dog adapted to be deflected by said arm during the last part of the forward movement of the feed table and to deflect said shifting arm for opening the movable jaw during the first part of the backward movement of the feed table, means for locking the movable jaw in its open position while the feed table is moving backwardly and unlocking the same upon reaching the magazine comprising a vertically swinging locking lever pivoted on the feed table and provided at one end with a detent adapted to engage said movable jaw and hold it open, at its other end with a weight adapted to move said lever in the direction for shifting the detent into its operative position, and a tappet arranged on the lever adapted to be engaged by the drop plate during its descent and to turn the lever in the direction for moving the detent into its inoperative position, and a carrying mechanism having a gripper which is adapted to attach itself to the upper side of the heads at the transfer place and move the heads away therefrom.

20. A barrel making machine comprising a magazine adapted to contain a pile of barrel heads, and feeding means for removing said heads successively from said pile including a feed table and a rocking support carrying said table, a rotary eccentric, and a link connected at one end with said rocking support and provided at its other end with a strap surrounding said eccentric.

21. A barrel making machine comprising a magazine adapted to contain a pile of barrel heads, and feeding means for removing said heads successively from said pile including a feed table and a rocking support carrying said table, a rotary eccentric, a link connected at one end with said rocking support and provided at its other end with a strap surrounding said eccentric, a constantly rotating shaft, and means for coupling and uncoupling said eccentric and shaft.

22. A barrel making machine comprising a magazine adapted to contain a pile of barrel heads, and feeding means for removing said heads successively from said pile including a feed table and a rocking support carrying said table, a rotary eccentric, a link connected at one end with said rocking support and provided at its other end with a strap surrounding said eccentric, a constantly rotating shaft, and means for coupling and uncoupling said eccentric and shaft comprising a clutch disk secured to said shaft and provided with an annular row of clutch pins, a coupling dog movably mounted on said eccentric and having a hook adapted to engage one of said pins, a spring for holding said dog yieldingly into engagement with said clutch pins, a releasing pawl adapted to disengage said clutch dog from said clutch pins, and a trip bar adapted to disengage said releasing pawl from said clutch dog.

23. A barrel making machine comprising a magazine adapted to contain a pile of barrel heads, and feeding means for removing said heads successively from said pile including a feed table and a rocking support carrying said table, a rotary eccentric, a link connected at one end with said rocking support and provided at its other end with a strap surrounding said eccentric, a constantly rotating shaft, and means for coupling and uncoupling said eccentric and shaft, comprising a clutch disk secured to said shaft and provided with an annular row of clutch pins, a coupling dog movably mounted on said eccentric and having a hook adapted to engage one of said pins, a spring for holding said dog yieldingly into engagement with said clutch pins, a releasing pawl adapted to disengage said clutch dog from said clutch pins, a trip bar adapted to disengage said releasing pawl from said clutch dog, a rocking operating shaft and a rock arm arranged on said shaft and connected with said bar.

24. A barrel making machine comprising a magazine adapted to contain a pile of barrel heads, and feeding means for removing said heads successively from said pile including a feed table and a rocking support carrying said table, a rotary eccentric, a link connected at one end with said rocking support and provided at its other end with a strap surrounding said eccentric, a constantly rotating shaft, and means for coupling and uncoupling said eccentric and shaft comprising a clutch disk secured to said shaft and provided with an annular row of clutch pins, a coupling dog movably mounted on said eccentric and having a hook adapted to engage one of said pins, and also provided with a tail, a spring for turning said dog in the direction for engaging one of said clutch pins, a releasing pawl having a hook adapted to engage the tail of said dog and also provided with a releasing lug and a restoring lug having an abrupt front face, an inclined rear face and a horizontal upper side, and a longitudinally movable trip bar having a releasing lug adapted to engage the releasing lug of said pawl and a restoring lug provided with an inclined front face adapted to engage with the inclined rear face of the releasing lug on the releasing pawl, a horizontal underside adapted to engage the corresponding surface of the releasing lug on the releasing pawl, and an abrupt rear surface which is adapted to drop over the abrupt front face of the releasing lug on said releasing pawl.

25. A barrel making machine comprising a magazine adapted to contain a pile of barrel heads, and feeding means for removing said heads successively from said pile including a feed table and a rocking support carrying said table, a rotary eccentric, a link connected at one end with said rocking support and provided at its other end with a strap surrounding said eccentric, a constantly rotating shaft, and means for coupling and uncoupling said eccentric and shaft comprising a clutch disk secured to said shaft and provided with an annular row of clutch pins, a coupling dog movably mounted on said eccentric and having a hook adapted to engage one of said pins and also provided with a tail, a spring for turning said dog in the direction for engaging one of said clutch pins, a releasing pawl having a hook adapted to engage the tail of said dog and also provided with a releasing lug and a restoring lug having an abrupt front face, an inclined rear face and a horizontal upper side, and a longitudinally movable trip bar having a releasing lug adapted to engage the releasing lug of said pawl, a restoring lug provided with an inclined front face adapted to engage with the inclined rear face of the releasing lug on the releasing pawl, a horizontal underside adapted to engage the corresponding surface of the releasing lug on the releasing pawl, and an abrupt rear surface which is adapted to drop over the abrupt front face of the releasing lug on said releasing pawl and a pin upon which said releasing pawl is pivoted and said trip bar is guided.

26. A barrel making machine comprising a magazine, adapted to contain a pile of barrel heads, feeding means for feeding the heads successively from said magazine, a movable carrying mechanism which receives said heads from said feeding means and means for controlling the action of said feeding means by motion derived from said carrying means.

27. A barrel making machine comprising a magazine adapted to contain a pile of barrel heads, feeding means for feeding the heads successively from said magazine, a constantly rotating shaft, a clutch for connecting and disconnecting said feeding means and shaft, a carrying mechanism which receives the heads from said feeding means and carries the same away and which has a horizontally movable member, and means for controlling the operation of said clutch by motion derived from said horizontally movable member.

28. A barrel making machine comprising a magazine adapted to contain a pile of barrel heads, feeding means for feeding the heads successively from said magazine, a constantly rotating shaft, a clutch for connecting and disconnecting said feeding means and shaft, a carrying mechanism which receives the heads from said feeding means and carries the same away and which has a horizontally movable member, and means for controlling the operation of said clutch by motion derived from said horizontally movable member comprising an upright operating shaft, a rock arm arranged on said operating shaft and operatively connected with said clutch, and a rock lever connected with said operating shaft and operatively connected with said horizontally movable member.

29. A barrel making machine comprising a magazine adapted to contain a pile of barrel heads, feeding means for feeding the heads successively from said magazine, a constantly rotating shaft, a clutch for connecting and disconnecting said feeding means and shaft, a carrying mechanism having a horizontally movable suction pipe and a pneumatic gripper adapted to engage with the heads presented by said feed mechanism, and means for controlling the operation of said clutch including an operating shaft, a rock arm arranged on said operating shaft and operatively connected with said clutch, and a rock lever connected with said operating shaft and operatively connected with said suction pipe.

30. A barrel making machine comprising a heading feeder, and means for carrying the barrel heads away from said feeder including a stationary conduit through which air is exhausted and which has a vertical nozzle, a pneumatic gripper adapted to engage the barrel heads and having a vertical tubular shank slidable vertically in said nozzle and also rotatable horizontally therein, a packing ring surrounding said shank and engaging with the end of said nozzle and a retaining ring arranged below the packing ring and mounted on the lower part of said nozzle, the periphery of said shank and the bore of said nozzle being separated by an intervening space to permit lateral movement of said shank in said nozzle and said packing ring being slidable laterally on said nozzle.

31. A barrel making machine comprising a heading feeder, and means for carrying the barrel heads away from said feeder including a stationary conduit through which air is exhausted, a pneumatic gripper adapted to engage the barrel head and connected with said stationary conduit so as to be capable of a horizontally swinging and a vertically reciprocating motion relatively to said conduit and means for guiding said gripper including an upright guide rod extending axially through said nozzle and shank and secured to the latter, and supports external of said shank and nozzle on which said rod is capable of sliding and turning, each of said supports comprising a pair of concave rollers which are mounted on a stationary support and receive the guide rod between them.

32. A barrel making machine comprising a pair of horizontally swinging compressor arms adapted to move toward and from opposite sides of a barrel body, an oscillating compressor shaft, a toggle mechanism arranged between said shaft and said compressor arms, a driving member, a clutch for connecting and disconnecting said driving member and shaft, shifting means for coupling said clutch, opening means for opening said arms, and actuating means adapted to be coupled either with said shifting means or said opening means.

33. A barrel making machine comprising a pair of horizontally swinging compressor arms adapted to move toward and from opposite sides of a barrel body, an oscillating compressor shaft, a toggle mechanism arranged between said compressor shaft and said compressor arms, a constantly rotating driving wheel mounted loosely on said shaft and having a clutch face, a driven wheel splined on said shaft and having a clutch face adapted to engage with the clutch face of said driving wheel, a shifting lever for shifting said driven clutch wheel into engagement with said driving wheel, an opening lever for operating said toggle mechanism in the direction for opening said arms, a foot lever, and means for transmitting the motion of said foot lever either to said shifting lever or said opening lever.

34. A barrel making machine comprising a pair of horizontally swinging compressor arms adapted to move toward and from opposite sides of a barrel body, an oscillating compressor shaft, a toggle mechanism arranged between said shaft and said compressor arms, a constantly rotating driving wheel mounted loosely on said shaft and having a clutch face, a driven wheel splined on said shaft and having a clutch face adapted to engage with the clutch face of said driving wheel, a shifting lever for moving said driven clutch wheel into engagement with said driving wheel and causing said toggle mechanism to be operated for closing said compressor arms, an opening lever for shifting said toggle mechanism in the direction for opening said compressor arms, a foot lever, and means for transmitting the motion of said foot lever either to said shifting lever or said opening lever comprising a coupling bar pivoted on said foot lever and movable into engagement with either said shifting lever or said opening lever.

35. A barrel making machine comprising a pair of horizontally swinging compressor arms adapted to move toward and from opposite sides of a barrel body and having rearwardly projecting toggle lugs, an oscillating compressor shaft, a hub arranged on said shaft and having toggle lugs, toggle links each connecting one toggle lug of said hub with the toggle lug of one of said compressor arms, a constantly rotating driving wheel mounted loosely on said shaft and having a clutch face, a driven wheel splined on said shaft and having a clutch face adapted to engage with the clutch face of said driving wheel, a shifting lever for shifting said driven clutch wheel into engagement with said driving wheel, an opening lever for moving said toggle links in the direction for opening said arms, a foot lever, means for transmitting the motion of said foot lever either to said shifting lever or said opening lever comprising a coupling bar pivoted on said foot lever and movable into engagement with either said shifting lever or said opening lever, and means for shifting said coupling bar.

36. A barrel making machine comprising a pair of horizontally swinging compressor arms adapted to move toward and from opposite sides of a barrel body and having rearwardly projecting toggle lugs, an oscillating compressor shaft, a hub arranged on said shaft and having toggle lugs, toggle links each connecting one toggle lug of said hub with the toggle lug of one of said compressor arms, a constantly rotating driving wheel mounted loosely on said shaft and having a clutch face, a driven wheel splined on said shaft and having a clutch face adapted to engage with the clutch face of said driving wheel, a shifting lever for shifting said driven clutch wheel into engagement with said driving wheel, an opening lever for moving said toggle links in the direction for opening said arms, a foot lever, means for transmitting the motion of said foot lever either to said shifting lever or said opening lever comprising a coupling bar pivoted on said foot lever and movable into engagement with either said shifting lever or said opening lever, and means for shifting said coupling bar comprising a reversing lever having one of its arms connected with said coupling lever, and a cam arranged on said compressor shaft and engaging with the other arm of said reversing lever.

37. A barrel making machine comprising a pair of horizontally swinging compressor arms adapted to move toward and from opposite sides of a barrel body, an oscillating compressor shaft, a toggle mechanism connecting said shaft with said compressor arms, a constantly rotating driving wheel mounted loosely on said shaft and having a clutch face, a driven wheel splined on said shaft and having a clutch face adapted to engage with the clutch face of said driving wheel, a shifting lever for shifting said driven clutch wheel into engagement with said driving wheel, an opening lever for moving said toggle mechanism in the direction for opening said arms, a foot lever, means for transmitting the motion of said foot lever either to said shifting lever or said opening lever comprising a coupling bar pivoted on said foot lever and movable into engagement with either said shifting lever or said opening lever, and means for shifting said coupling bar comprising a reversing lever having one of its arms connected with said coupling lever, and a cam arranged on said compressor shaft and engaging with the other arm of said reversing lever, said reversing lever having sections, and a yielding connection between said sections.

38. A barrel making machine comprising a pair of horizontally swinging compressor arms adapted to move toward and from opposite sides of a barrel body, an oscillating compressor shaft, a toggle mechanism connecting said shaft with said compressor arms, a constantly rotating driving wheel mounted loosely on said shaft and having a clutch face, a driven wheel splined on said shaft and having a clutch face adapted to engage with the clutch face of said driving wheel, a shifting lever for shifting said driven clutch wheel into engagement with said driving wheel, an opening lever for moving said toggle mechanism in the direction for opening said arms, a foot lever, means for transmitting the motion of said foot lever either to said shifting lever or said opening lever comprising a coupling bar pivoted on said foot lever and movable into engagement with either said shifting lever or said opening lever, and means for shifting said coupling bar comprising a reversing lever having one of its arms connected with said coupling lever, and a cam arranged on said compressor shaft and engaging with the other arm of said reversing lever, said reversing lever having sections and a yielding connection between said sections, which comprise pivotal points on said sections which engage each other, a tension bolt passing through said sections and having a head engaging the outer side of one of said sections, and a spring surrounding said tension bolt between the outer side of the other section and the nut of said bolt.

39. A barrel making machine comprising a pair of horizontally swinging compressor arms adapted to move toward and from opposite sides of a barrel body, an oscillating compressor shaft, a toggle mechanism connecting said shaft with said compressor arms, a constantly rotating driving wheel mounted loosely on said shaft and having a clutch face, a driven wheel splined on said shaft and having a clutch face adapted to engage with the clutch face of said driving wheel, a shifting lever for shifting said driven clutch wheel into engagement with said driving wheel, an opening lever for moving said toggle mechanism in the direction for opening said arms, a foot lever, means for transmitting the motion of said foot lever either to said shifting lever or said opening lever, a throw-off lever movably supported on the frame, a tappet arranged on the driven clutch wheel and adapted to engage the one side of said throw-off lever near the free end thereof, and a tappet arranged on said opening lever and adapted to engage said throw-off lever on its opposite side intermediate of its ends.

40. A barrel making machine comprising a pair of horizontally swinging compressor arms adapted to move toward and from opposite sides of a barrel body, an oscillating compressor shaft, a toggle mechanism connecting said shaft with said compressor arms, a constantly rotating driving wheel mounted loosely on said shaft and having a clutch face, a driven wheel splined on said shaft and having a clutch face adapted to engage with the clutch face of said driving wheel, a shifting lever for shifting said driven clutch wheel into engagement with said driving wheel, an opening lever for moving said toggle mechanism in the direction for opening said arms, a foot lever, means for transmitting the motion of said foot lever either to said shifting lever or said opening lever, a throw-off lever movably supported on the frame, a tappet arranged on the driven clutch wheel and adapted to engage the one side of said throw-off lever near the free end thereof, and a tappet arranged on said opening lever and adapted to engage said throw-off lever on its opposite side intermediate of its ends, each of said tappets having the form of a screw which permits of adjusting the effect of the same on the part with which it engages.

41. A barrel making machine comprising a pair of horizontally swinging compressor arms adapted to move toward and from opposite sides of a barrel body, an oscillating compressor shaft, a toggle mechanism connecting said shaft with said compressor arms, a constantly rotating driving wheel mounted loosely on said shaft and having a clutch face, a driven wheel splined on said shaft and having a clutch face adapted to engage with the clutch face of said driving wheel, a shifting lever for shifting said driven clutch wheel into engagement with said driving wheel, an opening lever for moving said toggle mechanism in the direction for opening said arm, a foot lever, means for transmitting the motion of said foot lever either to said shifting lever or said opening lever, a throw-off lever movably supported on the frame, a tappet arranged on the driven clutch wheel and adapted to engage the one side of said throw-off lever near the free end thereof, and a tappet arranged on said opening lever and adapted to engage said throw-off lever on its opposite side intermediate of its ends, each of said tappets having the form of a screw which permits of adjusting the effect of the same on the part with which it engages and the tappet on said opening lever being also adjustable bodily in a direction toward and from the fulcrum of this lever.

42. A barrel making machine comprising a driving or hammer head adapted to strike a blow against the end hoop of a barrel, and means for operating said head comprising a driving arm upon one end of which the driving head is pivoted, a stationary support upon which the other end of said driving arm is pivoted, a constantly rotating friction wheel, a friction segment adapted to be moved into and out of engagement with the friction wheel and operatively connected with the driving arm, and means for maintaining said head in a horizontal position.

43. A barrel making machine comprising a driving or hammer head adapted to strike a blow against the end hoop of a barrel, and means for operating said head comprising a driving arm upon one end of which the driving head is pivoted a stationary support upon which the other end of said driving arm is pivoted, a constantly rotating friction wheel, a friction segment adapted to be moved into and out of engagement with the friction wheel and operatively connected with the driving arm, and means for maintaining said head in a horizontal position comprising a retaining link which is arranged parallel with said driving arm and is of the same length and pivotally connected at its opposite ends with said head and support.

44. A barrel making machine comprising a driving or hammer head adapted to deliver a blow against the end hoop of a barrel, and means for operating said head comprising a vertically swinging driving arm supporting said driving head, a vertically swinging depressing arm connected with said driving arm and provided with a friction segment, a friction wheel, and means for engaging and disengaging said friction segment and wheel.

45. A barrel making machine comprising a driving or hammer head adapted to deliver a blow against the end hoop of a barrel, and means for operating said head comprising a vertically swinging driving arm supporting said driving head, a vertically swinging depressing arm connected with said driving arm and provided with a friction segment, a friction wheel rotating about a fixed axis, and means for engaging and disengaging said friction segment and wheel comprising an upright link turning at its lower end about a fixed pivot, and means for moving said link toward and from said friction wheel.

46. A barrel making machine comprising a driving or hammer head adapted to deliver a blow against the end hoop of a barrel, and means for operating said head comprising a vertically swinging driving arm supporting said driving head, a vertically swinging depressing arm connected with said driving arm and provided with a friction segment, a friction wheel rotating about a fixed axis, and means for engaging and disengaging said friction segment and wheel comprising an upright link turning at its lower end about a fixed pivot, and means for moving said link toward and from said friction wheel comprising an operating arm mounted on said link, a spring tending to raise said operating arm, an intermediate lever bearing against said operating arm, a rock shaft, a depressing arm arranged on said rock shaft and engaging with said intermediate lever, and a hand lever connected with said rock shaft.

47. A barrel making machine comprising a driving or hammer head adapted to deliver a blow against the end hoop of a barrel, and means for operating said head comprising a vertically swinging driving arm supporting said driving head, a vertically swinging depressing arm connected with said driving arm and provided with a friction segment, a friction wheel rotating about a fixed axis, and means for engaging and disengaging said friction segment and wheel comprising an upright link turning at its lower end about a fixed pivot, and means for moving said link toward and from said friction wheel comprising an operating arm pivoted on said link, and means for adjusting the operating arm on said link about the pivotal connection between said link and operating arm.

48. A barrel making machine comprising a driving or hammer head adapted to deliver a blow against the end hoop of a barrel, and means for operating said head comprising a vertically swinging driving arm supporting said driving head, a vertically swinging depressing arm connected with said driving arm and provided with a friction segment, a friction wheel rotating about a fixed axis, and means for engaging and disengaging said friction segment and wheel comprising an upright link turning at its lower end about a fixed pivot, and means for moving said link toward and from said friction wheel comprising an operating arm pivoted on said link, and means for adjusting the operating arm on said link about the pivotal connection between said link and operating arm consisting of two adjusting screws mounted on said link and engaging with said operating arm on opposite sides of said pivotal connection.

49. A barrel making machine comprising compressing means having members which are movable toward and from the barrel body for contracting the same around the barrel head, driving means for delivering a blow against the end hoop of the body, and automatic means for effecting a release of said compressing means from the barrel body after the end driving means effect a blow against the end hoop on the body.

50. A barrel making machine comprising compressing means having members which are movable toward and from the barrel body for contracting the same around the barrel head, driving means for delivering a blow against the end hoop of the body, and automatic means for effecting a release of said compressing means from the barrel body after the end driving means effect a blow against the end hoop on the body, which automatic means are controlled by the last part of the action of said driving means.

51. A barrel making machine comprising a compressor mechanism having two compressor arms adapted to swing toward and from opposite sides of the body of the barrel for contracting the same around a barrel head, a rocking compressor shaft having a hub, toggle links connecting said hub with said compressor arms and adapted upon turning this shaft forwardly to close said arms about the barrel body and to open and move away from the barrel body upon turning the compressor shaft backwardly, driving means for delivering a blow against the end hoop of the barrel body, and means for opening said compressor arms upon completion of the blow of said driving means against said end hoop.

52. A barrel making machine comprising a compressor mechanism having two compressor arms adapted to swing toward and from opposite sides of the body of the barrel for contracting the same around a barrel head, a rocking compressor shaft having a hub, toggle links connecting said hub with said compressor arms and adapted upon turning this shaft forwardly to close said arms about the barrel body and to open and move away from the barrel body upon turning the compressor shaft backwardly, driving means for delivering a blow against the end hoop of the barrel body, and means for opening said compressor arms upon completion of the blow of said driving means against said end hoop comprising an opening lever having one arm operatively associated with said toggle mechanism and its other arm operatively associated with said driving means.

53. A barrel making machine comprising a compressor mechanism having two compressor arms adapted to swing toward and from opposite sides of the body of the barrel for contracting the same around a barrel head, a rocking compressor shaft having a hub, toggle links connecting said hub with said compressor arms and adapted upon turning this shaft forwardly to close said arms about the barrel body and to open and move away from the barrel body upon turning the compressor shaft backwardly, driving means for delivering a blow against the end hoop of the barrel body comprising a driving head adapted to engage said end, a vertically swinging driving arm carrying said driving head, a depressing arm connected with said driving arm and having a friction segment, a friction wheel adapted to be engaged by said segment, and means for opening said compressor mechanism at the completion of the end hoop driving operation comprising an opening lever having one arm operatively connected with said compressor mechanism so as to open the same upon moving said opening lever backwardly, and an intermediate lever having one arm connected with the other arm of said opening lever and arranged with its other arm in the path of said depressing lever so as to be actuated thereby.

54. A barrel making machine comprising a compressor mechanism for compressing the staves of the barrel body around the head within the same, a driving mechanism for driving the end hoop on the body, means for manually disengaging the compressing mechanism from the barrel body, and means for automatically disengaging the compressor mechanism from the barrel body.

55. A barrel making machine comprising a compressor mechanism for compressing the staves of the barrel body around the head within the same, a driving mechanism for driving the end hoop on the body, means for manually disengaging the compressing mechanism from the barrel body, and means for automatically disengaging the compressor mechanism from the barrel body by motion derived from the driving mechanism.

56. A barrel making machine comprising a compressor mechanism for compressing the staves of the barrel body around the head within the same, a driving mechanism for driving the end hoop on the body, means for manually disengaging the compressing mechanism from the barrel body, and means for automatically disengaging the compressor mechanism from the barrel body by motion derived from the driving mechanism at the completion of the operation of driving an end hoop on the body.

57. A barrel making machine comprising a compressor mechanism having two compressor arms adapted to swing toward and from opposite sides of the body of the barrel for contracting the same around a barrel head, a rocking compressor shaft having a hub, toggle links connecting said hub with said compressor arms and adapted upon turning this shaft forwardly to close said arms about the barrel body and to open and move away from the barrel body upon turning the compressor shaft backwardly, carrying means for moving a barrel head from a place of supply into the barrel body at the barrel assembling place and including a gripper which is movable vertically toward and from the head supplying place, and means for controlling the descent of said gripper comprising a vertically movable operating lever engaging said gripper, and means for actuating said lever by motion derived from said compressor shaft for permitting said gripper to descend into engagement with a barrel head at the supply place.

58. A barrel making machine comprising a compressor mechanism having two compressor arms adapted to swing toward and from opposite sides of the body of the barrel for contracting the same around a barrel head, a rocking compressor shaft having a hub, toggle links connecting said hub with said compressor arms and adapted upon turning this shaft forwardly to close said arms about the barrel body and to open and move away from the barrel body upon turning the compressor shaft backwardly, carrying means for moving a barrel head from a place of supply into the barrel body at the barrel assembling place and including a gripper which is movable vertically toward and from the head supplying place, and means for producing the vertical movement of said gripper comprising a vertically swinging lifting lever having a front arm supporting said gripper and a rear arm, a spring operating on said lever and tending to turn the same in the direction for lifting the gripper, a gripper depressing lever adapted to actuate said lifting lever for depressing said gripper and a cam arranged on said compressor shaft and adapted to turn said depressing lever in the direction for effecting lowering of said gripper.

59. A barrel making machine comprising a compressor mechanism having two compressor arms adapted to swing toward and from opposite sides of the body of the barrel for contracting the same around a barrel head, a rocking compressor shaft having a hub, toggle links connecting said hub with said compressor arms and adapted upon turning this shaft forwardly to close said arms about the barrel body and to open and move away from the barrel body upon turning the compressor shaft backwardly, carrying means for moving a barrel head from a place of supply into the barrel body at the barrel assembling place and including a gripper which is movable vertically toward and from the head supplying place and means for producing the vertical movement of said gripper comprising a vertically swinging lifting lever having a front arm supporting said gripper and a rear arm, a spring operating on said lever and tending to turn the same in the direction for lifting the gripper, a gripper depressing lever adapted to actuate said lifting lever for depressing said gripper and a cam arranged on said compressor shaft, and adapted during its forward movement with the compressor shaft to trip idly past said depressing lever, but during its return movement therewith to shift said depressing lever and effect lowering of said gripper.

60. A barrel making machine comprising a compressor mechanism having two compressor arms adapted to swing toward and from opposite sides of the body of the barrel for contracting the same around a barrel head, a rocking compressor shaft having a hub, toggle links connecting said hub with said compressor arms and adapted upon turning this shaft forwardly to close said arms about the barrel body and to open and move away from the barrel body upon turning the compressor shaft backwardly, carrying means for moving a barrel head from a place of supply into the barrel body at the barrel assembling place and including a gripper which is movable vertically toward and from the head supplying place, and means for producing the vertical movement of said gripper comprising a vertically swinging lifting lever having a front arm supporting said gripper and a rear arm, a spring operating on said lever and tending to turn the same in the direction for lifting the gripper, a gripper depressing lever adapted to actuate said lifting lever for depressing said gripper, a sliding pin for transmitting motion from said depressing lever to said lifting lever, and a cam arranged on said compressor shaft and adapted to turn said depressing lever in the direction for effecting lowering of said gripper.

61. A barrel making machine comprising a compressor mechanism having two compressor arms adapted to swing toward and from opposite sides of the body of the barrel for contracting the same around a barrel head, a rocking compressor shaft having a hub, toggle links connecting said hub with said compressor arms and adapted upon turning this shaft forwardly to close said arms about the barrel body and to open and move away from the barrel body upon turning the compressor shaft backwardly, carrying means for moving a barrel head from a place of supply into the barrel body at the barrel assembling place and including a gripper which is movable vertically toward and from the head supplying place, and means for producing the vertical movement of said gripper comprising a vertically swinging lifting lever having a front arm supporting said gripper and a rear arm, a spring operating on said lever and tending to turn the same in the direction for lifting the gripper, a gripper depressing lever adapted to actuate said lifting lever for depressing said gripper and mounted to turn both vertically and horizontally, and a cam mounted on said compressor shaft and having a peripheral cam face which deflects said depressing lever idly during the forward movement of said compressor shaft and also having a cam face on its underside which engages said depressing lever and turns the same effectively vertically for lowering said gripper.

62. A barrel making machine comprising a compressor mechanism having two compressor arms adapted to swing toward and from opposite sides of the body of the barrel for contracting the same around a barrel head, a rocking compressor shaft having a hub, toggle links connecting said hub with said compressor arms and adapted upon turning this shaft forwardly to close said arms about the barrel body and to open and move away from the barrel body upon turning the compressor shaft backwardly, carrying means for moving a barrel head from a place of supply into the barrel body at the barrel assembling place and including a gripper which is movable vertically toward and from the head supplying place, and means for producing the vertical movement of said gripper comprising a vertically swinging lifting lever having a front arm supporting said gripper and a rear arm, a spring operating on said lever and tending to turn the same in the direction for lifting the gripper, a gripper depressing lever adapted to actuate said lifting lever for depressing said gripper and mounted to turn both vertically and horizontally, a cam mounted on said compressor shaft and having a peripheral cam face which deflects said depressing lever idly during the forward movement of said compressor shaft and also having a cam face on its underside which engages said depressing lever and turns the same effectively vertically for lowering said gripper, and a spring for yieldingly turning said depressing lever horizontally in engagement with the peripheral face of said cam.

63. A barrel making machine comprising a compressor mechanism for pressing the staves of the barrel body around the head within the same, heading feed mechanism for supplying barrel heads, carrying mechanism for transferring the heads from the heading feed mechanism to the body within the compressor mechanism, a driving mechanism for driving an end hoop on the barrel body, automatic means for causing said heading carrying mechanism to grip a head supplied by the heading feed mechanism during the opening movement of said compressor mechanism, and automatic means which release said compressor mechanism after the driving mechanism has driven an end hoop on the body.

64. A barrel making machine comprising a compressor mechanism for pressing the staves of the barrel body around the head within the same, heading feed mechanism for supplying barrel heads, carrying mechanism for transferring the heads from the heading feed mechanism to the body within the compressor mechanism, which carrying mechanism has a gripper movable vertically toward and from the heading feed mechanism, a driving mechanism having a vertically movable driving head for driving an end hoop on the barrel body, automatic means which cause said gripper to descend into engagement with a barrel head by motion derived from said compressor mechanism during the release of the latter from the barrel body, and automatic means for effecting the release of the compressor mechanism from the barrel body by motion derived from said driving mechanism at the end of the operation of driving an end hoop on the barrel body.

EDWIN F. BEUGLER.